(12) United States Patent
Minamide et al.

(10) Patent No.: US 10,767,089 B2
(45) Date of Patent: Sep. 8, 2020

(54) THERMOPLASTIC POLYMER COMPOSITION AND MOLDED ARTICLE

(71) Applicant: KURARAY CO., LTD., Kurashiki-shi (JP)

(72) Inventors: Asako Minamide, Kamisu (JP); Mikio Masuda, Kamisu (JP); Masahiro Suzuki, Tsukuba (JP)

(73) Assignee: KURARAY CO., LTD., Kurashiki-shi (JP)

(*) Notice: Subject to any disclaimer, the term of this patent is extended or adjusted under 35 U.S.C. 154(b) by 0 days.

(21) Appl. No.: 15/498,041

(22) Filed: Apr. 26, 2017

(65) Prior Publication Data

US 2017/0226390 A1 Aug. 10, 2017

Related U.S. Application Data

(63) Continuation of application No. 14/371,858, filed as application No. PCT/JP2012/082514 on Dec. 14, 2012.

(30) Foreign Application Priority Data

Jan. 11, 2012 (JP) ................................ 2012-002956

(51) Int. Cl.
*C09J 153/02* (2006.01)
*B32B 9/04* (2006.01)
(Continued)

(52) U.S. Cl.
CPC ....... *C09J 153/025* (2013.01); *B29C 45/0001* (2013.01); *B29C 45/14778* (2013.01);
(Continued)

(58) Field of Classification Search
CPC ............ C04B 35/63408; C04B 37/008; C04B 35/6344; C04B 2237/365;
(Continued)

(56) References Cited

U.S. PATENT DOCUMENTS 4,477,501 A 10/1984 Kojima et al.
4,647,509 A * 3/1987 Wallace ................. B29C 51/14
428/474.9
(Continued)

FOREIGN PATENT DOCUMENTS

JP 63-25005 2/1988
JP 9-156035 6/1997
(Continued)

OTHER PUBLICATIONS

English translation of WO 2009/151029, pp. 1-9, May 2017.*
(Continued)

*Primary Examiner* — Alexander C Kollias
(74) *Attorney, Agent, or Firm* — Oblon, McClelland, Maier & Neustadt, L.L.P.

(57) ABSTRACT

The present invention is a thermoplastic polymer composition which contains 10-120 parts by mass of a polar group-containing polypropylene resin (B) per 100 parts by mass of a thermoplastic elastomer (A) that is a block copolymer having a polymer block containing an aromatic vinyl compound unit and a polymer block composed of a conjugated diene unit having 40% by mole or more of 1,2-bonds and 3,4-bonds in total, or a hydrogenated product of the block copolymer (provided that a thermoplastic polymer composition containing 1 part by mass or more of a polyvinyl acetal resin is excluded). This thermoplastic polymer composition is able to be bonded with a ceramic, a metal or a synthetic resin without requiring a primer treatment, and has excellent flexibility, mechanical characteristics, moldability, heat resistance and storage stability.

14 Claims, 3 Drawing Sheets

(51) Int. Cl.
| | |
|---|---|
| *B29C 45/14* | (2006.01) |
| *B32B 27/30* | (2006.01) |
| *B32B 27/32* | (2006.01) |
| *B29C 45/00* | (2006.01) |
| *C04B 37/00* | (2006.01) |
| *C04B 35/634* | (2006.01) |
| *B32B 27/18* | (2006.01) |
| *B32B 9/00* | (2006.01) |
| *C08L 23/10* | (2006.01) |
| *B29C 70/68* | (2006.01) |
| *B32B 15/085* | (2006.01) |
| *B32B 18/00* | (2006.01) |
| *B32B 27/06* | (2006.01) |
| *B32B 27/08* | (2006.01) |
| *C08L 53/02* | (2006.01) |
| *B29K 23/00* | (2006.01) |
| *B29K 96/04* | (2006.01) |
| *B29K 105/00* | (2006.01) |
| *B29K 705/02* | (2006.01) |
| *B29L 31/34* | (2006.01) |

(52) U.S. Cl.
CPC .......... *B29C 70/68* (2013.01); *B29C 70/683* (2013.01); *B32B 9/005* (2013.01); *B32B 9/045* (2013.01); *B32B 15/085* (2013.01); *B32B 18/00* (2013.01); *B32B 27/06* (2013.01); *B32B 27/08* (2013.01); *B32B 27/18* (2013.01); *B32B 27/302* (2013.01); *B32B 27/32* (2013.01); *C04B 35/6344* (2013.01); *C04B 35/63408* (2013.01); *C04B 37/008* (2013.01); *C08L 23/10* (2013.01); *C08L 53/025* (2013.01); *B29K 2023/12* (2013.01); *B29K 2023/14* (2013.01); *B29K 2096/04* (2013.01); *B29K 2105/0005* (2013.01); *B29K 2105/0085* (2013.01); *B29K 2105/0088* (2013.01); *B29K 2705/02* (2013.01); *B29K 2995/0088* (2013.01); *B29L 2031/3481* (2013.01); *B32B 2270/00* (2013.01); *B32B 2274/00* (2013.01); *B32B 2307/306* (2013.01); *B32B 2457/00* (2013.01); *C04B 2237/34* (2013.01); *C04B 2237/343* (2013.01); *C04B 2237/346* (2013.01); *C04B 2237/348* (2013.01); *C04B 2237/36* (2013.01); *C04B 2237/365* (2013.01); *C04B 2237/368* (2013.01); *Y10T 428/31667* (2015.04); *Y10T 428/31696* (2015.04); *Y10T 428/31931* (2015.04)

(58) Field of Classification Search
CPC ........ C04B 2237/348; C04B 2237/346; C04B 2237/368; C04B 2237/34; C04B 2237/343; C04B 2237/36; B29C 45/14778; B29C 45/0001; B29C 70/683; B29C 70/68; C08L 23/10; C08L 53/025; C08L 23/26; C08L 53/02; C08L 101/00; C09J 153/025; B32B 27/302; B32B 27/32; B32B 15/085; B32B 27/08; B32B 27/06; B32B 18/00; B32B 27/18; B32B 9/005; B32B 9/045; B32B 2307/306; B32B 2457/00; B32B 2270/00; B32B 2274/00; B29K 2023/14; B29K 2023/12; B29K 2096/04; B29K 2105/0005; B29K 2105/0085; B29K 2105/0088; B29K 2705/02; B29K 2995/0088; B29L 2031/3481; Y10T 428/31931; Y10T 428/31667; Y10T 428/31696

See application file for complete search history.

(56) References Cited

U.S. PATENT DOCUMENTS

| | | | |
|---|---|---|---|
| 5,883,188 A * | 3/1999 | Hwang | C08L 51/06 428/523 |
| 6,112,888 A * | 9/2000 | Sauro | B65D 81/266 206/204 |
| 6,425,965 B1 * | 7/2002 | Silva | C06B 23/003 149/109.6 |
| 6,663,975 B1 | 12/2003 | Toyosawa et al. | |
| 6,797,779 B1 * | 9/2004 | Ajbani | C08F 279/02 524/424 |
| 2001/0018490 A1 | 8/2001 | Mashita et al. | |
| 2006/0276592 A1 | 12/2006 | Kanae et al. | |
| 2007/0232747 A1 | 10/2007 | Maris et al. | |
| 2009/0137716 A1 | 5/2009 | Furukawa et al. | |
| 2009/0247688 A1 | 10/2009 | Jogo et al. | |
| 2009/0269590 A1 | 10/2009 | Furukawa et al. | |
| 2010/0152386 A1 * | 6/2010 | Miwa | C08F 8/04 525/98 |
| 2010/0174027 A1 * | 7/2010 | Sasaki | C08L 23/02 524/505 |
| 2011/0023994 A1 | 2/2011 | Meinzinger | |
| 2011/0172348 A1 | 7/2011 | Hoya et al. | |
| 2011/0217538 A1 | 9/2011 | Miura et al. | |
| 2013/0090420 A1 | 4/2013 | Kuwahara et al. | |
| 2013/0122289 A1 | 5/2013 | Minamide et al. | |
| 2013/0157069 A1 | 6/2013 | Minamide et al. | |
| 2013/0196164 A1 | 8/2013 | Minamide et al. | |

FOREIGN PATENT DOCUMENTS

| | | |
|---|---|---|
| JP | 11-130932 | 5/1999 |
| JP | 2001-192527 | 7/2001 |
| JP | 2001-280507 | 10/2001 |
| JP | 2001-302874 | 10/2001 |
| JP | 2006-206715 | 8/2006 |
| JP | 2006-291019 | 10/2006 |
| JP | 2006-528255 | 12/2006 |
| JP | 2009-067969 | 4/2009 |
| JP | 2009-227844 | 10/2009 |
| JP | 2010-1364 | 1/2010 |
| JP | 2011-184503 | 9/2011 |
| JP | 2011-219703 | 11/2011 |
| JP | 2012-162696 | 8/2012 |
| WO | 2009/151029 A1 | 12/2009 |
| WO | 2012/026501 A1 | 3/2012 |

OTHER PUBLICATIONS

Dupont Derlin Acetal REsin Molding Guide, pp. 1-48, Dupont, Nov. 2006.*
International Search Report dated Apr. 2, 2013, in PCT/JP12/082514 filed Dec. 14, 2012.
Office Action dated Apr. 12, 2016 issued in corresponding Japanese Application No. 2013-553222 (w/English Translation).
English translation and Abstract of WO2009/0151029A1.
SNT Search Report, pp. 1-2, dated Jan. 2017.
Eastman Product data—Regality R1 100 Hydrocarbon Resin, Eastman Chemical BV, pp. 1-3, Apr. 2008.
Office Action dated Apr. 29, 2019 issued in corresponding Korean patent application No. 10-2019-7004493 (with computer-generated translation).
Korean Notice of Final Rejection dated Jan. 14, 2019 in Korean Patent Application No. 10-2014-7019075 (with unedited computer generated English translation), 6 pages.

* cited by examiner

- 4. INSERT PART
- 2. VACUUM LINE
- 1: EMBEDDED HEATER
- 5. THERMOPLASTIC POLYMER COMPOSITION

- 6. WATERWAY FOR CONTROLLING MOLD TEMPERATURE

THERMOPLASTIC POLYMER COMPOSITION AND MOLDED ARTICLE

CROSS REFERENCE TO RELATED APPLICATIONS

The present application is a continuation of U.S. patent application Ser. No. 14/371,858, filed on Jul. 11, 2014, which was a 35 U.S.C. § 371 national stage patent application of International patent application PCT/JP2012/082514, filed on Dec. 14, 2012, and claims the benefit of the filing date of Japanese application no. 2012-002956, filed on Jan. 11, 2012, the text of each of which is incorporated by reference.

TECHNICAL FIELD

The present invention relates to a thermoplastic polymer composition that can be adhered to a ceramic, a metal or a synthetic resin without performing a primer treatment or the like and has excellent flexibility, mechanical properties, moldability, heat resistance and storage stability, and a molded article thereof, and also relates to a method for producing the molded article, particularly a molded article in which the thermoplastic polymer composition is adhered to a ceramic, a metal or a synthetic resin, by insert molding.

BACKGROUND ART

Ceramics, metals and synthetic resins, having excellent durability, heat resistance and mechanical strength are widely used in various uses such as household appliances, electronic parts, machine parts and automobile parts. Those members are sometimes used by adhering to or combining with an elastomer member having excellent flexibility for the purpose of fixing to other structural member or for the purpose of shock absorption, breakage prevention or sealing, depending on intended use, parts structure and use method.

As such an elastomer member, a styrenic thermoplastic elastomer having excellent flexibility, mechanical properties and moldability is sometimes preferably used. The styrenic thermoplastic elastomer used herein means a block copolymer having a polymer block including aromatic vinyl compound units and a polymer block including conjugated diene compound units, or a hydrogenated product thereof. However, the styrenic thermoplastic elastomer is a material having low polarity, and its adhesive force to a ceramic, a metal or the like is not sufficient, and the styrenic thermoplastic elastomer has a problem that melting adhesion is difficult as it is. For this reason, in order that a ceramic or a metal and the styrenic thermoplastic elastomer adhere to each other, a method of applying an adhesive or previously applying a primer treatment to the surface of the ceramic, metal or synthetic resin is disclosed (see Patent Documents 1 to 6).

However, the methods disclosed in Patent Documents 1 to 6 have the problems that not only steps are complicated, but productivity is decreased and production costs are increased.

To those problems, a thermoplastic polymer composition containing a styrenic thermoplastic elastomer, a modified polyolefin and a softener is disclosed (see Patent Document 7). This thermoplastic polymer composition can be adhered to a ceramic, a metal and a synthetic resin by only a heat treatment without applying an adhesive or conducting a primer treatment.

Furthermore, Patent Document 8 discloses a thermoplastic polymer composition containing a specific styrenic thermoplastic elastomer and a functional polyolefin, in which overmolding to a polar support containing polyamide is possible and compression set under high temperature is small.

RELATED ART REFERENCES

Patent Documents

Patent Document 1: JP-A-2006-291019
Patent Document 2: JP-A-2006-206715
Patent Document 3: JP-A-63-25005
Patent Document 4: JP-A-9-156035
Patent Document 5: JP-A-2009-227844
Patent Document 6: JP-A-2010-1364
Patent Document 7: JP-A-2001-192527
Patent Document 8: JP-T-2006-528255

SUMMARY OF THE INVENTION

Problems to be Solved by Invention

However, as for the thermoplastic polymer composition disclosed in Patent Document 7, when a molded article including the thermoplastic polymer composition adhered to a metal or a synthetic resin is placed in a temperature environment of 60° C. or higher, the adhesiveness of the thermoplastic polymer composition decreases to practically insufficient extent. This phenomenon becomes a problem in automobile parts exposed to a temperature of 60° C. or higher in summer. Furthermore, the thermoplastic polymer composition disclosed in Patent Document 7 does not always adhere in sufficient strength by insert molding, and this becomes a problem in the case where the thermoplastic polymer composition is used by adhering to a housing material of electric and electronic instruments, OA instruments, electrical household appliances and the like.

In the thermoplastic polymer composition disclosed in Patent Document 8, a large amount of a plasticizer must be substantially used for securing moldability. Bleeding of the plasticizer occurs when the molded article has been stored over a long period of time, adhesive characteristics are decreased, and storage stability becomes impaired.

From the above, the thermoplastic polymer compositions disclosed in Patent Documents 7 and 8 have been required to be further improved.

Accordingly, an object of the present invention is to provide a thermoplastic polymer composition that can be adhered to a ceramic, a metal or a synthetic resin without performing a primer treatment or the like and has excellent flexibility, mechanical properties, moldability, heat resistance and storage stability, and a molded article thereof, and is to further provide a method for producing a molded article in which the thermoplastic polymer composition is adhered to a ceramic, a metal or a synthetic resin, by insert molding.

Means for Solving the Problems

According to the present invention, the above object can be achieved by providing:
[1] A thermoplastic polymer composition including 10 to 120 parts by mass of a polar group-containing polypropylene resin (B) with respect to 100 parts by mass of a thermoplastic elastomer (A) that is a block copolymer comprising a polymer block comprising aromatic vinyl compound units; and a polymer block comprising conjugated diene compound units having a total amount of 1,2-bonds and 3,4-bonds of 40 mol % or more, or a hydrogenated product of the block copolymer, provided that a thermoplastic polymer composition containing 1 part by mass or more of a polyvinyl acetal resin is excluded;

[2] The thermoplastic polymer composition according to [1] above, wherein the conjugated diene compound units are isoprene units;

[3] The thermoplastic polymer composition according to [1] or [2] above, comprising 10 to 100 parts by mass of the polar group-containing polypropylene resin (B) with respect to 100 parts by mass of the thermoplastic elastomer (A);

[4] The thermoplastic polymer composition according to any one of [1] to [3] above, wherein the thermoplastic elastomer (A) has a weight average molecular weight (Mw) of 70,000 to 200,000, and is a linear block copolymer;

[5] The thermoplastic polymer composition according to any one of [1] to [4] above, further comprising a tackifier resin (C) in an amount of 1 to 100 parts by mass per 100 parts by mass of the thermoplastic elastomer (A);

[6] The thermoplastic polymer composition according to any one of [1] to [5] above, wherein the polar group-containing polypropylene resin (B) is a carboxylic acid-modified polypropylene resin;

[7] A molded article using the thermoplastic polymer composition according to any one of [1] to [6] above;

[8] The molded article according to [7] above, wherein the thermoplastic polymer composition is adhered to at least one kind selected from a ceramic, a metal and a synthetic resin;

[9] The molded article according to [8] above, wherein ceramics, metals or synthetic resins are adhered to each other by the thermoplastic polymer composition, or at least two kinds selected from a ceramic, a metal and a synthetic resin are adhered to each other by the thermoplastic polymer composition:

[10] A method for producing the molded article according to [7] above by insert molding, comprising filling a mold holding an insert part with the thermoplastic polymer composition according to any one of [1] to [6] above, and molding the thermoplastic polymer composition, wherein a temperature of the insert part during the insert molding is 30 to 150° C.; and

[11] A method for producing the molded article according to [7] above, using at least one kind selected from a ceramic, a metal and a synthetic resin as an insert part.

Effect of Invention

A thermoplastic polymer composition of the present invention can be adhered to a ceramic, a metal or a synthetic resin without performing a primer treatment or the like and has excellent flexibility, mechanical properties, moldability, storage stability and heat resistance. Of course, the thermoplastic polymer composition can be adhered to a ceramic, a metal or a synthetic resin, that has been subjected to a primer treatment.

A molded article in which a thermoplastic polymer composition of the present invention is adhered to a ceramic, a metal or a synthetic resin has practically sufficient adhesiveness even through placed in an environment of 60° C. or higher, and can be used in a wide range of uses. Furthermore, a molded article in which a thermoplastic polymer composition of the present invention is adhered thereto a ceramic, a metal or a synthetic resin in higher adhesive strength can be produced, and the molded article thus obtained can be used in uses requiring higher adhesive strength.

Furthermore, a molded article of the present invention can maintain good adhesiveness without bleeding of a softener or the like even through the molded article is stored over a long period of time.

EMBODIMENTS FOR CARRYING OUT THE INVENTION

Figure 1:
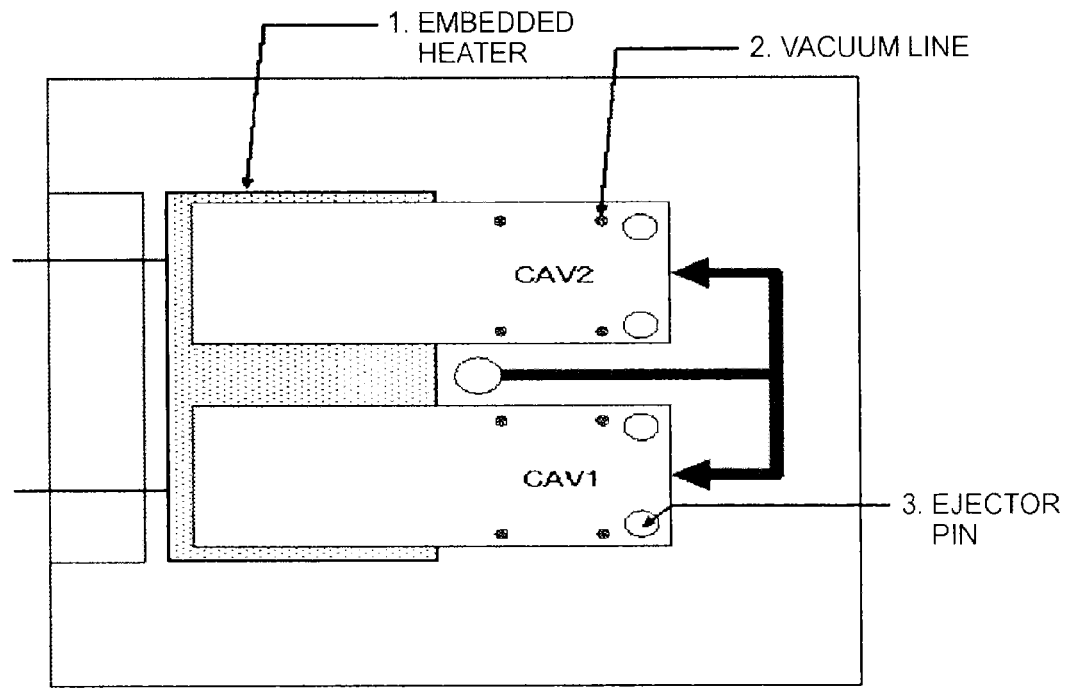
FIG. 1 is a front view of a movable side mold for insert molding, employed in examples and comparative examples.

A thermoplastic polymer composition and a molded article thereof will be first described, and then a method for producing a molded article by insert molding will be described.

[Thermoplastic Polymer Composition]

A thermoplastic polymer composition of the present invention is a thermoplastic polymer composition including 10 to 120 parts by mass of a polar group-containing polypropylene resin (B) with respect to 100 parts by mass of a thermoplastic elastomer (A) that is a block copolymer including: a polymer block including aromatic vinyl compound units; and a polymer block including conjugated diene compound units having a total amount of 1,2-bonds and 3,4-bonds of 40 mol % or more, or a hydrogenated product of the block copolymer (hereinafter abbreviated as a thermoplastic elastomer (A)). The thermoplastic polymer composition of the present invention may further include a tackifier resin (C) and the like. Constituent components of the thermoplastic polymer composition of the present invention are described below.

(Thermoplastic Elastomer (A))

The thermoplastic elastomer (A) imparts flexibility, good mechanical properties and moldability to a thermoplastic polymer composition of the present invention, and plays a role of a matrix in the composition. It is presumed in the present invention that when the total amount of 1,2-bonds and 3,4-bonds is 40 mol % or more in the polymer block including conjugated diene compound units as described above, compatibility with the polar group-containing polypropylene resin (B) is particularly increased, thereby giving high insert adhesiveness and high adhesiveness in a temperature environment of 60° C. or higher to the thermoplastic polymer composition obtained. In the present description, adhesiveness between the thermoplastic polymer composition and insert parts in a molded article obtained by insert molding is sometimes referred to as "insert adhesiveness".

Polymer Block Including Aromatic Vinyl Compound Units

Examples of an aromatic vinyl compound constituting the polymer block including aromatic vinyl compound units include styrene, α-methylstyrene, 2-methylstyrene, 3-methyl styrene, 4-methyl styrene, 4-propyl styrene, 4-cyclohexylstyrene, 4-dodecyl styrene, 2-ethyl-4-benzylstyrene, 4-(phenylbutyl)styrene, 1-vinylnaphthalene and 2-vinylnaphthalene. The polymer block including aromatic vinyl compound units may include structural units derived from only one kind of those aromatic vinyl compounds, and may include structural units derived from two kinds or more thereof. Of those, styrene, α-methylstyrene and 4-methylstyrene are preferred.

In the present invention, the "polymer block including aromatic vinyl compound units" is preferably a polymer block including 80% by mass or more of aromatic vinyl compound units, more preferably a polymer block including 90% by mass or more of aromatic vinyl compound units, and still more preferably a polymer block including 95% by mass or more of aromatic vinyl compound units (each value is a value in terms of an amount of a raw material charged). The polymer block including aromatic vinyl compound units may have only aromatic vinyl compound units, but may have other copolymerizable monomer unit together with the aromatic vinyl compound units, so long as the advantage of the present invention is not impaired.

Examples of the other copolymerizable monomer include 1-butene, pentene, hexene, butadiene, isoprene and methyl vinyl ether. In the case of having the other copolymerizable monomer unit, the proportion thereof is preferably 20% by mass or less, more preferably 10% by mass or less, and still more preferably 5% by mass or less, based on the total structural units of the polymer block including aromatic vinyl compound units.

Polymer Block Including Conjugated Diene Compound Units

A compound constituting the polymer block including conjugated diene compound units may be all a conjugated diene having 4 to 8 carbon atoms, or their mixtures. The compound is preferably butadiene, isoprene or a mixture of butadiene and isoprene, and more preferably isoprene. The polymer block including conjugated diene compound units may have only conjugated diene compound units, but may have other copolymerizable monomer unit together with the conjugated diene compound units, so long as the advantage of the present invention does not become impaired. Examples of the other copolymerizable monomer include styrene, α-methylstyrene and 4-methylstyrene. The proportion of the other copolymerizable monomer is preferably 20% by mass or less, more preferably 10% by mass or less, and still more preferably 5% by mass or less, based on the total structural units of the polymer block including conjugated diene compound units.

Regarding the bonding form of the compound constituting the polymer block including conjugated diene compound units, the total amount of 1,2-bonds and 3,4-bonds is required to be 40 mol % or more as described before from the view point of heat resistance. From the same view point, the total amount is preferably 45 to 90 mol %, more preferably 50 to 85 mol %, and still more preferably 50 to 80 mol % The bonding form other than 1,2-bond and 3,4-bond is 1,4-bond, and the amount of 1,2-bond is generally less than 5 mol %.

The total amount of 1,2-bonds and 3,4-bonds can be calculated by $^1$H-NMR measurement. Specifically, the total amount can be calculated from a ratio between an integrated value of peaks present in 4.2 to 5.0 ppm derived from 1,2-bond and 3,4-bond units and an integrated value of peaks present in 5.0 to 5.45 ppm derived from 1,4-bond unit.

The bonding form between the polymer block including aromatic vinyl compound units and the polymer block including conjugated diene compound units in the thermoplastic elastomer (A) is not particularly limited, and may be a linear pattern, a branched pattern, a radial pattern or a bonding form of a combination of two or more thereof. Linear bonding form is preferred.

When the polymer block including aromatic vinyl compound units is represented by a and the polymer block including conjugated diene compound units is represented by b, examples of the linear bonding form include a diblock copolymer represented by a-b, a triblock copolymer represented by a-b-a or b-a-b, a tetrablock copolymer represented by a-b-a-b, a pentablock copolymer represented by a-b-a-b-a or b-a-b-a-b, (a-b)$_n$X type copolymer (X represents a coupling residue, and n is an integer of 2 or more), and mixtures of those. Of those, the triblock copolymer is preferred, and the triblock copolymer represented by a-b-a is more preferred.

From the view point of improvement in heat resistance and weather resistance, the thermoplastic elastomer (A) is preferably that a part or the whole of the polymer block including conjugated compound units is hydrogenated (hereinafter, sometimes abbreviated as "hydrogenation"). The degree of hydrogenation of the polymer block including conjugated diene compound units in such a case is preferably 80% or more, and more preferably 90% or more. In the present description, the degree of hydrogenation is a value obtained by measuring an iodine value of the thermoplastic elastomer (A) before and after the hydrogenation reaction.

The content of the polymer block including aromatic vinyl compound units in the thermoplastic elastomer (A) is preferably 5 to 75% by mass, more preferably 5 to 60% by mass, still more preferably 10 to 40% by mass, and particularly preferably 15 to 25% by mass, based on the entire thermoplastic elastomer (A), from the view points of flexibility and mechanical properties.

The weight average molecular weight of the linear thermoplastic elastomer (A) is preferably 30,000 to 500,000, more preferably 50,000 to 400,000, more preferably 60,000 to 200,000, still more preferably 70,000 to 200,000, particularly preferably 70,000 to 190,000, and most preferably 80,000 to 180,000, from the view points of mechanical properties and moldability. When the weight average molecular weight is 30,000 or more, good mechanical properties are obtained, and when the weight average molecular weight is 500,000 or less, good moldability is obtained. The weight average molecular weight used herein is a weight average molecular weight in terms of polystyrene obtained by gel permeation chromatography (GPC) measurement.

The thermoplastic elastomer (A) may be used in one kind alone and may be used by combining two kinds or more thereof.

As described above, the specific thermoplastic elastomer (A) is contained in the thermoplastic polymer composition of the present invention. Additionally, "the block copolymer having the polymer block including aromatic vinyl compound units and the polymer block including conjugated diene compound units having the amount of 1,4-bonds exceeding 60 mol % or a hydrogenated product thereof" can be contained. However, to prevent the advantage of the present invention from being remarkably impaired, the content of "the block copolymer including the polymer block including aromatic vinyl compound units and the block copolymer including conjugated diene compound units having the amount of 1,4-bonds exceeding 60 mol % or a hydrogenated product thereof" is preferably 120 parts by mass or less, more preferably 100 parts by mass or less, more preferably 50 parts by mass or less, more preferably 20 parts by mass or less, still more preferably 10 parts by mass or less, and particularly preferably substantially 0 parts by mass, with respect to 100 parts by mass of the thermoplastic elastomer (A). When the content is 120 parts by mass or less with respect to 100 parts by mass of the thermoplastic elastomer (A), mechanical properties such as tensile strength at break and elongation at break become good. Furthermore, in the molded article in which the thermoplastic polymer composition is adhered to a ceramic, a metal or a synthetic resin, adhesiveness in a temperature environment of 60° C. or higher is excellent, and peeling does not easily occur. This is presumed that compatibility with a component (B) described hereinafter is related.

Each term in the parenthesis above is explained in the same way as the above-described explanation, except for the term "the polymer block including conjugated diene compound units having the amount of 1,4-bonds exceeding 60 mol %".

In "the polymer block including conjugated diene compound units having the amount of 1,4-bonds exceeding 60 mol %", examples of a conjugated diene compound that derives the conjugated diene compound units include isoprene, butadiene, 2,3-dimethyl-1,3-butadiene, 1,3-pentadiene and 1,3-hexadiene.

The polymer block including conjugated diene compound units having the amount of 1,4-bonds exceeding 60 mol % may include structural units derived from only one kind of the conjugated diene compound, and may include structural units derived from two kinds or more thereof. It is particularly preferred that the polymer block includes structural units derived from butadiene or isoprene, or structural units derived from butadiene and isoprene.

The amount of 1,4-bonds can be calculated by $^1$H-NMR measurement described before.

(Production Method of Thermoplastic Elastomer (A))

The production method of the thermoplastic elastomer (A) is not particularly limited. For example, the thermoplastic elastomer (A) can be produced by an anionic polymerization method. Specific methods are described below.

(i) A method of sequentially polymerizing an aromatic vinyl compound, a conjugated diene compound such as isoprene, and then an aromatic vinyl compound, using an alkyl lithium compound as an initiator.
(ii) A method of sequentially polymerizing an aromatic vinyl compound and a conjugated diene compound such as isoprene, using an alkyl lithium compound as an initiator, and then adding a coupling agent to perform coupling.
(iii) A method of sequentially polymerizing a conjugated diene compound such as isoprene, and then an aromatic vinyl compound, using a dilithium compound as an initiator.

Examples of the alkyl lithium compound in (i) and (ii) above include methyllithium, ethyllithium, n-butyllithium, sec-butyllithium, tert-butyllithium and pentyllithium. Examples of the coupling agent in (ii) above include dichloromethane, dibromomethane, dichloroethane, dibromoethane and dibromobenzene. Examples of the dilithium compound in (iii) above include naphthalene dilithium and dithiohexyl benzene.

The amount of the initiator such as an alkyl lithium compound or a dilithium compound, and the coupling agent used is determined by a weight average molecular weight of the target thermoplastic elastomer (A). The initiator such as an alkyl lithium compound or a dilithium compound is generally used in an amount of 0.01 to 0.2 parts by mass with respect to 100 parts by mass of the total amount of the aromatic vinyl compound and isoprene used in an anionic polymerization method. In (ii) above, the coupling agent is generally used in an amount of 0.001 to 0.8 parts by mass with respect to 100 parts by mass of the total amount of the aromatic vinyl compound and the conjugated diene compound such as isoprene, used in an anionic polymerization method.

The anionic polymerization is preferably conducted in the presence of a solvent. The solvent is not particularly limited so long as it is inert to the initiator and does not adversely affect the polymerization. Examples of the solvent include saturated aliphatic hydrocarbons such as hexane, heptane, octane and decane; and aromatic hydrocarbons such as toluene, benzene and xylene. The polymerization is generally conducted at 0 to 80° C. for 0.5 to 50 hours in any method described above.

In conducting the anionic polymerization, the total amount of 1,2-bonds and 3,4-bonds in the thermoplastic elastomer (A) can be increased by adding, for example, an organic Lewis base, and the total amount of 1,2-bonds and 3,4-bonds in the thermoplastic elastomer (A) can be easily controlled by the amount of the organic Lewis base added.

Examples of the organic Lewis base include esters such as ethyl acetate; amines such as triethylamine, N,N,N',N'-tetramethylethylene diamine (TMEDA) and N-methylmorpholine; nitrogen-containing heterocyclic aromatic compounds such as pyridine; amides such as dimethyl acetamide; ethers such as dimethyl ether, diethyl ether, tetrahydrofuran (THF) and dioxane; glycol ethers such as ethylene glycol dimethyl ether and diethylene glycol dimethyl ether; sulfoxides such as dimethyl sulfoxide; and ketones such as acetone and methyl ethyl ketone. Those organic Lewis bases may be used in one kind alone and may be used by combining two kinds or more thereof.

The amount of the organic Lewis base used is preferably 0.01 to 1,000 times, more preferably 0.1 to 100 times, and still more preferably 0.1 to 50 times, in stoichiometric ratio to lithium ions contained in the initiator from the view point for achieving that the total amount of 1,2-bonds and 3,4-bonds in the thermoplastic elastomer (A) is 40 mol % or more. When the amount of the organic Lewis base used is adjusted within this range, the total amount of 1,2-bonds and 3,4-bonds in the thermoplastic elastomer (A) can be optionally controlled.

After conducting polymerization by the above method, the block copolymer contained in a reaction liquid is solidified by pouring the reaction liquid in a poor solvent of the block copolymer, such as methanol, or is removed by pouring the reaction liquid in hot water together steam to perform azeotropy (steam stripping), followed by drying. Thus, an unhydrogenated thermoplastic elastomer (A) can be isolated.

The hydrogenated thermoplastic elastomer (A) can be produced by subjecting the unhydrogenated thermoplastic elastomer (A) obtained above to a hydrogenation reaction. The hydrogenation reaction can be conducted by dissolving the unhydrogenated styrenic thermoplastic elastomer (A) obtained above in a solvent inert to the reaction and the hydrogenation catalyst or using the unhydrogenated thermoplastic elastomer (A) just as it is without isolating from the reaction liquid and reacting with hydrogen in the presence of a hydrogenation catalyst.

Examples of the hydrogenation catalyst include Raney nickel; a heterogeneous catalyst obtained by supporting a metal such as Pt, Pd, Ru, Rh or Ni on a carrier such as carbon, alumina or diatomaceous earth; a Ziegler catalyst of a combination of a transition metal compound and an alkyl aluminum compound, alkyl lithium compound or the like; and a metallocene catalyst.

The hydrogenation reaction can be generally conducted under the conditions of hydrogen pressure: 0.1 to 20 MPa, reaction temperature: 20 to 250° C., and reaction time: 0.1 to 100 hours. In the case of this method, the hydrogenated thermoplastic elastomer (A) can be isolated by pouring the hydrogenation reaction liquid in a poor solvent such as methanol to solidify, or poring the hydrogenation reaction liquid in hot water together steam to remove a solvent by azeotropy (steam stripping), followed by drying.

(Polar Group-Containing Polypropylene Resin (B))

When the polar group-containing polypropylene resin (B) is contained in the thermoplastic polymer composition of the present invention, the composition can be well adhered to a ceramic, a metal or a synthetic resin, and a molded article in which the thermoplastic polymer composition of the present invention is adhered to a ceramic, a metal or a synthetic resin can maintain high adhesiveness even though exposed to a temperature environment of 60° C. or higher.

Examples of the polar group present in the polar group-containing polypropylene resin (B) include (meth)acryloyloxy group; hydroxyl group; amide group; halogen atom such as chlorine atom; carboxyl group; and acid anhydride group. The production method of the polar group-containing polypropylene resin (B) is not particularly limited. The polar group-containing polypropylene resin (B) is obtained by random copolymerizing, block copolymerizing or graft copolymerizing propylene and the polar group-containing copolymerizable monomer by know methods. Of those, random copolymerization and graft copolymerization are preferred, and graft copolymerization is more preferred. Other than the above, the polar group-containing polypropylene resin is obtained by subjecting a polypropylene resin to a reaction such as oxidation or chlorination by known methods.

The polar group-containing polypropylene resin (B) may be a resin obtained by copolymerizing α-olefin other than propylene with the polar group-containing copolymerizable monomer together with propylene. Examples of the α-olefin include ethylene, 1-butene, 1-pentene, 1-hexene, 1-octene, 4-methyl-1-pentene and cyclohexene. The α-olefin can be copolymerized with the polar group-containing copolymerizable monomer by known methods, and examples of the copolymerization include random copolymerization, block copolymerization and graft copolymerization. The proportion of the structural unit derived from α-olefin other than propylene to the total structural units present in the polar group-containing polypropylene resin (B) is preferably 0 to 45 mol %, more preferably 0 to 35 mol %, and still more preferably 0 to 25 mol %.

Examples of the polar group-containing copolymerizable monomer include vinyl acetate, vinyl chloride, ethylene oxide, propylene oxide, acrylamide, and unsaturated carboxylic acid or its ester or anhydride. Of those, unsaturated carboxylic acid or its ester or anhydride is preferred. Examples of the unsaturated carboxylic acid or its ester or anhydride include (meth)acrylic acid, (meth)acrylic acid ester, maleic acid, maleic anhydride, fumaric acid, itaconic acid, itaconic anhydride, himic acid and himic anhydride. Of those, maleic acid and maleic anhydride are more preferred. Those polar group-containing copolymerizable monomers may be used in one kind alone and may be used by combining two kinds or more thereof.

The polar group-containing polyprolyene resin (B) is preferably polypropylene containing a carboxyl group as a polar group, that is, a carboxylic acid-modified polypropylene resin, and more preferably a maleic acid-modified polypropylene resin and a maleic anhydride-modified polypropylene resin, from the view point of adhesiveness.

Specific examples of the (meth)acrylic acid ester exemplified as the polar group-containing copolymerizable monomer include acrylic acid alkyl esters such as methyl acrylate, ethyl acrylate, n-propyl acrylate, isopropyl acrylate, n-butyl acrylate, isobutyl acrylate, n-hexyl acrylate, isohexyl acrylate, n-octyl acrylate, isooctyl acrylate and 2-ethylhexyl acrylate; and methacrylic acid alkyl esters such as methyl methacrylate, ethyl methacrylate, n-propyl methacrylate, isopropyl methacrylate, n-butyl methacrylate, isobutyl methacrylate, n-hexyl methacrylate, isohexyl methacrylate, n-octyl methacrylate, isooctyl methacrylate and 2-ethylhexyl methacrylate. Those (meth)acrylic acid esters may be used in one kind alone and may be used by combining two kinds or more thereof.

The polar group present in the polar group-containing polypropylene resin (B) may be post-treated after polymerization. For example, (meth)acrylic acid group or carboxylic acid may be neutralized with a metal ion to form an ionomer, or may be esterified with methanol or ethanol. Furthermore, hydrolysis of vinyl acetate may be conducted.

Melt flow rate (MFR) under the conditions of 230° C. and load: 2.16 kg (21.18N) of the polar group-containing polypropylene resin (B) is preferably 0.1 to 300 g/10 min, more preferably 0.1 to 100 g/10 min, more preferably 0.1 to 50 g/10 min, more preferably 1 to 30 g/10 min, still more preferably 1 to 20 g/10 min, and particularly preferably 1 to 15 g/10 min. When the MFR under the above conditions of the polar group-containing polypropylene resin (B) is 0.1 g/10 min or more, good moldability is obtained. On the other hand, when the MFR is 300 g/10 min or less, mechanical properties are easy to be developed.

The melting point of the polar group-containing polypropylene resin (B) is preferably 100° C. or higher, more preferably 110 to 170° C., and still more preferably 120 to 145° C., from the view point of heat resistance. The melting point used herein means a value read from an endothermic peak of a differential scanning calorimetry curve when increasing a temperature in a rate of 10° C./min.

The proportion of the polar group-containing structural unit present in the polar group-containing polypropylene resin (B) to the entire structural unit present in the polar group-containing polypropylene resin (B) is preferably 0.01 to 10 mass %. When the proportion is 0.01 mass % or more, adhesiveness to a ceramic, a metal and a synthetic resin is increased. When the proportion of the polar group-containing structural unit is 10 mass % or less, affinity with the thermoplastic resin (A) is improved, and mechanical properties become good. Furthermore, formation of a gel can be suppressed. From the same view point, the proportion is preferably 0.01 to 7 mass %, more preferably 0.01 to 5 mass %, more preferably 0.1 to 5 mass %, more preferably 0.1 to 3 mass %, and still more preferably 0.2 to 1 mass %. The polypropylene resin having a polar group-containing structural unit in high concentration is diluted with a polypropylene resin that does not have a polar group-containing structural unit such that the proportion of the polar group-containing structural unit is optimized, and such a polypropylene resin may be used.

The thermoplastic polymer composition of the present invention contains 10 to 120 parts by mass of the polar group-containing polypropylene resin (B) with respect to 100 parts by mass of the thermoplastic elastomer (A). Where the amount of the polar group-containing polypropylene resin (B) is less than 10 parts by mass, the thermoplastic polymer composition becomes difficult to adhere to a ceramic, a metal or a synthetic resin. On the other hand, where the amount of the polar group-containing polypropylene resin (B) is more than 120 parts by mass, sufficient adhesiveness is obtained, but the thermoplastic polymer composition becomes hard, and flexibility and mechanical properties are difficult to be developed. From the same view point, the content of the polar group-containing polypropylene resin (B) is preferably 15 parts by mass or more, and more preferably 20 parts by mass or more, and is preferably 100 parts by mass or less, more preferably 80 parts by mass or less, and still more preferably 70 parts by mass or less, with respect to 100 parts by mass of the thermoplastic elastomer (A).

From the above, the content of the polar group-containing polypropylene resin (B) is preferably 15 to 100 parts by mass, more preferably 15 to 80 parts by mass, and still more preferably 20 to 70 parts by mass, with respect to 100 parts by mass of the thermoplastic elastomer (A).

(Tackifier Resin (C))

The thermoplastic polymer composition of the present invention can further contain a tackifier resin (C) as necessary. When the tackifier resin (C) is contained, moldability is further improved while maintaining adhesive characteristics.

Examples of the tackifier resin (C) include aliphatic unsaturated hydrocarbon resin, aliphatic saturated hydrocarbon resin, alicyclic unsaturated hydrocarbon resin, alicyclic saturated hydrocarbon resin, aromatic hydrocarbon resin, hydrogenated aromatic hydrocarbon resin, rosin ester resin, hydrogenated rosin ester resin, terpene phenol resin, hydrogenated terpene phenol resin, terpene resin, hydrogenated terpene resin, aromatic hydrocarbon-modified terpene resin, coumarone-indene resin, phenol resin and xylene resin. The tackifier resin (C) may be used in one kind alone, and may be used by combining two kinds or more thereof. Of those, aliphatic saturated hydrocarbon resin, alicyclic saturated hydrocarbon resin, hydrogenated aromatic hydrocarbon resin and hydrogenated terpene resin are preferred, and hydrogenated aromatic hydrocarbon resin and hydrogenated terpene resin are more preferred.

The softening point of the tackifier resin (C) is preferably 50 to 200° C., more preferably 65 to 180° C., and still more preferably 80 to 160° C. When the softening point is 50° C. or higher, adhesive characteristics to an environmental temperature and storage stability of a molded article of the thermoplastic polymer composition can be maintained. On the other hand, when the softening point is 200° C. or lower, adhesive characteristics to a heat treatment temperature can be maintained. The softening point used herein is a value measured according to ASTM 28-67.

When the tackifier resin (C) is contained in the thermoplastic polymer composition of the present invention, the content thereof is preferably 1 to 100 parts by mass, more preferably 5 to 70 parts by mass, still more preferably 5 to 50 parts by mass, and particularly preferably 10 to 45 parts by mass, with respect to 100 parts by mass of the thermoplastic elastomer (A). When the content of the tackifier resin (C) is 100 parts by mass or less, with respect to 100 parts by mass of the thermoplastic elastomer (A), the thermoplastic polymer composition does not become hard, and flexibility and mechanical properties are easily developed.

(Other Optional Components)

The thermoplastic polymer composition of the present invention may contain a softener within a range that does not remarkably impair the advantage of the present invention, as necessary. The softener is not particularly limited, and includes softeners that are generally used in rubbers and plastics.

Examples of the softener include paraffinic, naphthenic and aromatic process oils; phthalic acid derivatives such as dioctyl phthalate and dibutyl phthalate; white oil, mineral oil, an oligomer of ethylene and α-olefin, paraffin wax, liquid paraffin, polybutene, low molecular weight polybutene and low molecular weight polyisoprene. Of those, process oils are preferred, and paraffinic process oil is more preferred.

Other than the above, organic acid ester plasticizers such as monobasic organic acid ester and polybasic organic acid ester; and phosphoric acid plasticizers such as organophosphate and organophosphite; and the like can be used.

Examples of the monobasic organic acid ester include glycolic esters, represented by triethylene glycol-dicaproate, triethylene glycol-di-2-ethyl butyrate, triethylene glycol-di-n-octylate or triethylene glycol-di-2-ethyl hexylate, which are obtained by the reaction between: glycols such as triethylene glycol, tetraethylene glycol or tripropylene glycol; and monobasic oraganic acid such as butyric acid, isobutyric acid, caproic acid, 2-ethylbutyric acid, heptylic acid, n-octylic acid, 2-ethylhexylic acid, pelargonic acid (n-nonylic acid) or decylic acid.

Examples of the polybasic organic ester include esters between a polybasic organic acid such as adipic acid, sebacic acid or azelaic acid, and alcohols, as represented by dibutyl sebacate, dioctyl azelate or dibutylcarbitol adipate.

Examples of the organic phosphate include tributoxylethyl phosphate, isodecylphenyl phosphate and triisopropyl phosphate.

The softener may be used in one kind alone and may be used by combining two kinds or more thereof.

When the softener is contained, the content thereof is preferably a range that storage stability of a molded article of the thermoplastic polymer composition obtained does not become impaired. The content is preferably 100 parts by mass or less, more preferably 70 parts by mass or less, still more preferably 28 parts by mass or less, and particularly preferably 10 parts by mass or less, with respect to 100 parts by mass of the thermoplastic elastomer (A).

The thermoplastic polymer composition of the present invention may contain other thermoplastic polymer such as olefinic polymer, styrenic polymer, polyphenylene ether polymer or polyethylene glycol in a range that does not remarkably impair the advantage of the present invention, as necessary. Examples of the olefinic polymer include polyethylene, polypropylene, polybutene, and a block copolymer or a random copolymer, between propylene and other α-olefin such as ethylene or 1-butene.

When the other thermoplastic elastomer is contained, the content thereof is preferably 100 parts by mass or less, more preferably 50 parts by mass or less, more preferably 20 parts by mass or less, still more preferably 10 parts by mass or less, and particularly preferably 5 parts by mass or less, with respect to 100 parts by mass of the thermoplastic elastomer (A).

The thermoplastic polymer composition of the present invention may contain an inorganic filler, as necessary.

The inorganic filler is useful in the improvement in properties such as heat resistance and weather resistance of the thermoplastic polymer composition of the present invention, the adjustment in hardness, and the improvement in economic efficiency as an extender, and the like. The inorganic filler is not particularly limited. Examples of the inorganic filler include calcium carbonate, talc, magnesium hydroxide, aluminum hydroxide, mica, clay, natural silicic acid, synthetic silicic acid, titanium oxide, carbon black, barium sulfate, glass balloons and glass fibers. The inorganic filler may be used in one kind alone and may be used by combining two kinds or more thereof.

When the inorganic filler is contained, the content thereof is preferably a range that the flexibility of the thermoplastic polymer composition does not become impaired. In general, the content is preferably 100 parts by mass or less, more preferably 70 parts by mass or less, still more preferably 30 parts by mass or less, and particularly preferably 10 parts by mass or less, with respect to 100 parts by mass of the thermoplastic elastomer (A).

The thermoplastic polymer composition of the present invention may contain an antioxidant, a lubricant, a light stabilizer, a processing aid, a coloring agent such as a pigment or a dye, a flame retardant, an antistatic agent, a matting agent, a silicone oil, a blocking inhibitor, an ultraviolet absorber, a release agent, a foaming agent, an antibacterial agent, an anti-mold agent, a perfume, and the like, in a range that does not impair the advantage of the present invention.

Examples of the antioxidant include hindered phenol type, phosphorus type, lactone type and hydroxyl type antioxidants. Of those, the hindered phenol type antioxidant is preferred. When the antioxidant is contained, the content thereof is preferably a range that coloration does not occur when the thermoplastic polymer composition obtained is melt-kneaded. The content is preferably 0.1 to 5 parts by mass with respect to 100 parts by mass of the thermoplastic elastomer (A).

The preparation method of the thermoplastic polymer composition of the present invention is not particularly limited, and the composition may be prepared by any method so long as it is a method that can uniformly mix the components. The composition is generally obtained by a melt-kneading method. The melt-kneading can be conducted using a melt-kneading apparatus such as a single-screw extruder, a twin-screw extruder, a kneader, a batch mixer, a roller or Banbury mixer. In general, the thermoplastic polymer composition of the present invention can be obtained by conducting the melt-kneading at preferably 170 to 270° C.

The thermoplastic polymer composition thus obtained of the present invention has hardness by JIS K6253, JIS-A method (hereinafter sometimes referred to as "A hardness") of preferably 90 or less, more preferably 30 to 90, and still more preferably 35 to 85. Where the A hardness is too high, flexibility, elasticity and mechanical properties are difficult to be developed, and the composition tends to be difficult to be preferably used as a thermoplastic polymer composition having excellent adhesiveness to a synthetic resin, particularly a resin containing an inorganic filler (glass fibers or the like), a ceramic and a metal.

The melt flow rate (MFR) of the thermoplastic polymer composition measured by the method according to JIS K7210 under the conditions of 230° C. and load: 2.16 kg (21.18N) is within a range of preferably 1 to 50 g/10 min, more preferably 1 to 40 g/10 min, and still more preferably 2 to 30 g/10 min. When the MFR falls within this range, good moldability is obtained, and this facilitates a step for adhering the composition to a synthetic resin, particularly a synthetic resin containing an inorganic filler (glass fibers or the like), a ceramic and a metal.

[Molded Article]

The present invention further provides a molded article using the thermoplastic polymer composition of the present invention.

The thermoplastic polymer composition of the present invention has excellent moldability. Therefore, various molded articles can be produced. The molded article may be a sheet or a film.

As a molding method, it is possible to use various molding methods generally used to a thermoplastic polymer composition. Specifically, optional molding method such as an injection molding method, an extrusion molding method, a compression molding method, a blow molding method, a calender molding method or a casting method can be employed. Furthermore, general T-die method, calender method, inflation method or belt method can be employed to mold a film or a sheet.

It is preferred that the molded article using the thermoplastic polymer composition of the present invention does not cause bleeding in order to maintain stable adhesiveness even after the storage for a long period of time. Specifically, it is preferred that bleeding is not observed when a sheet molded from the thermoplastic polymer composition is cut into a diameter of 29 mm and sandwiched between cardboards, a weight of 1 kg is placed thereon, and the state of the cardboards after allowing to stand at 70° C. for 360 hours is observed.

The present invention further provides a molded article in which the thermoplastic polymer composition is adhered to at least one kind selected from a ceramic, a metal and a synthetic resin, and a molded article in which ceramics, metals or synthetic resins are adhered to each other by the thermoplastic polymer composition, or at least two kinds selected from a ceramic, a metal and a synthetic resin are adhered to each other by the thermoplastic polymer composition. The molded article in which the thermoplastic polymer composition is adhered to at least one kind selected from a ceramic (particularly a glass) and a metal (particularly aluminum) is particularly preferred. The adhesive force of the thermoplastic polymer composition in the molded article is preferably 20 N/25 mm or more, more preferably 30 N/25 mm or more, and still more preferably 60 N/25 mm or more, in a compression molding method. The adhesive force of 20 N/25 mm or more is comparable to the adhesive force in the case of conducting a surface treatment such as a primer, and is a practically durable adhesive force. The adhesive force used herein is a value measured by the method described in the examples according to JIS K6854-2.

The ceramic that can be used in the molded article of the present invention means non-metal type inorganic material, and includes metal oxide, metal carbide and metal nitride. Examples of the ceramic include glass, cements, alumina, zirconia, zinc oxide type ceramic, barium titanate, lead zirconate titanate, silicon carbide, silicon nitride and ferrites.

Examples of the metal that can be used in the molded article of the present invention include iron, copper, aluminum, magnesium, nickel, chromium, zinc and alloys including those as components. The molded article may be a molded article having a metal surface formed by plating such as copper plating, nickel plating, chromium plating, tin plating, zinc plating, platinum plating, gold plating or silver plating.

Light metal such as aluminum or a magnesium alloy is used in a housing material of electric and electronic instruments, OA instruments, electrical household appliances, members for automobiles, and the like, and such a housing material can be used.

Examples of the synthetic resin that can be used in the molded article of the present invention include a polyamide resin, a polyester resin, a polycarbonate resin, a polyphenylene sulfide resin, a (meth)acrylonitrile-butadiene-styrene resin, a (meth)acrylonitrile-styrene resin, a (meth)acrylate-butadiene-styrene resin, a (meth)acrylate-styrene resin, a butadiene-styrene resin, an epoxy resin, a phenol resin, a diallyl phthalate resin, a polyimide resin, a melamine resin, a polyacetal resin, a polysulfone resin, a polyether sulfone resin, a polyether imide resin, a polyphenylene ether resin, a polyarylate resin, a polyether ether ketone resin, a polystyrene resin, a syndiotactic polystyrene resin, and a polyolefin resin. Those resins may be used in one kind alone or may be used by combining two kinds or more thereof.

The synthetic resin may contain an inorganic filler. Examples of the inorganic filler include calcium carbonate, talc, magnesium hydroxide, aluminum hydroxide, mica, clay, natural silicic acid, synthetic silicic acid, titanium oxide, carbon black, barium sulfate, glass fibers and glass balloons. The inorganic filler may be used in one kind alone and may be used by combining two kinds or more thereof. Of those, glass fibers are preferred.

The amount of the inorganic filler compounded is preferably a range that moldability and mechanical strength of the synthetic resin containing the inorganic filler are not impaired. The amount is preferably 0.1 to 100 parts by mass, more preferably 1 to 50 parts by mass, and still more preferably 3 to 40 parts by mass, with respect to 100 parts by mass of the synthetic resin.

The production method of the molded article in which the thermoplastic polymer composition is adhered to a ceramic or a metal is not particularly limited, and any method can be employed so long as it is a method for producing a molded article by melt adhesion. Examples of the method include an insert molding method, an extrusion lamination method, a compression molding method, and a melt casting method.

The method for producing a molded article by an insert molding method will be described hereinafter.

In the case of producing a molded article by the extrusion lamination method, the molded article can be produced by directly extruding the thermoplastic polymer composition of the present invention in a molten state extruded from a die having a given shape attached to an extruder to a surface or its edge of an adherend of a ceramic or a metal, previously formed in a given shape and size.

In the case of producing a molded article by a compression molding method, the molded article can be produced by previously molding a molded article of the thermoplastic polymer composition of the present invention by an injection molding method or an extrusion molding method, and adhering the molded article to an adherend previously formed in a given shape and size using a compression molding machine by heating and pressurizing. In this case, a protective layer of a non-polar resin such as an olefinic resin or a cyclic olefinic resin may be provided as an outermost layer on the surface that does not adhere to the adherend for the purpose of protection and decoration, as necessary.

The production method of the molded article including the thermoplastic polymer composition adhered to the synthetic resin is not particularly limited. The thermoplastic polymer composition and the synthetic resin can be simultaneously melted and then subjected to co-extrusion molding or co-injection molding. Furthermore, melt-coating or solution-coating may be applied on one molded article previously molded. Other than the above, two-color molding and insert molding can be employed.

[Production Method of Molded Article by Insert Molding]

The present invention further provides a method for producing a molded article in which the thermoplastic polymer composition of the present invention is adhered to a ceramic, a metal or a synthetic resin by insert molding.

The "insert molding" used herein means a method for obtaining an molded article of a thermoplastic polymer composition by inserting an insert part including a ceramic, a metal or a synthetic resin in a mold having a given shape and then filling the mold with the thermoplastic polymer composition, and a molded article in which the insert part and the thermoplastic polymer composition are integrated (hereinafter, the molded article obtained by adhering and integrating the insert part and the thermoplastic polymer composition is sometimes called an adhered body) can be obtained by the method.

(Insert Part)

The method for holding the insert part in the mold is not particularly limited, can employ known methods. Examples of the method include a fixing method using a pin, and a fixing method by a vacuum line.

At least one kind selected from the group consisting of a glass, a ceramic, a metal, a metal-plated material and a synthetic resin is preferably used as the insert part used in the present invention, and a ceramic, a metal and a metal-plated material are more preferably used.

(Mold)

The mold used in insert molding is not particularly limited, and for example, the molds shown in FIGS. 1 to 6 are preferably used.

Figure 2:
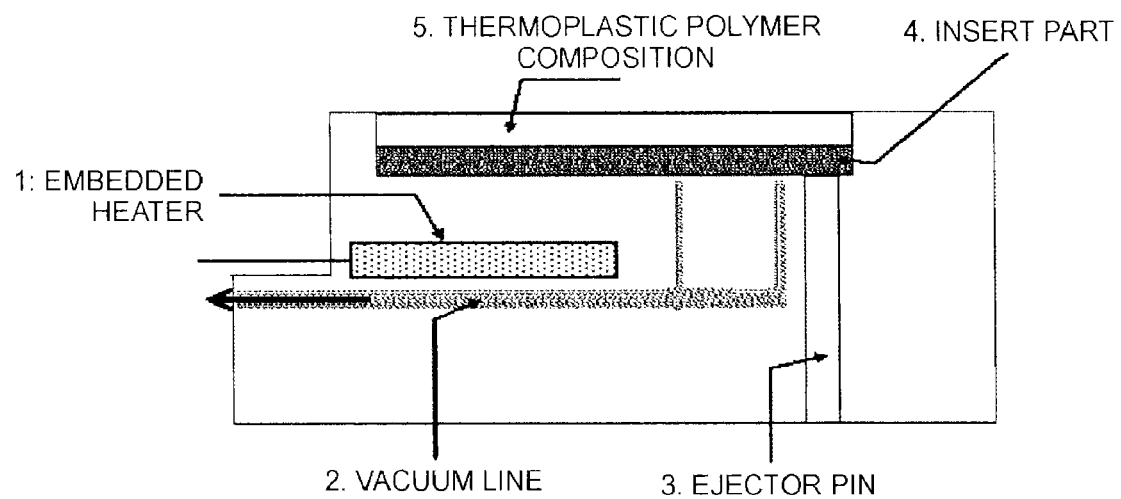
FIG. 2 is a horizontally cross-sectional view of a movable side mold for insert molding, employed in examples and comparative examples.
Figure 3:
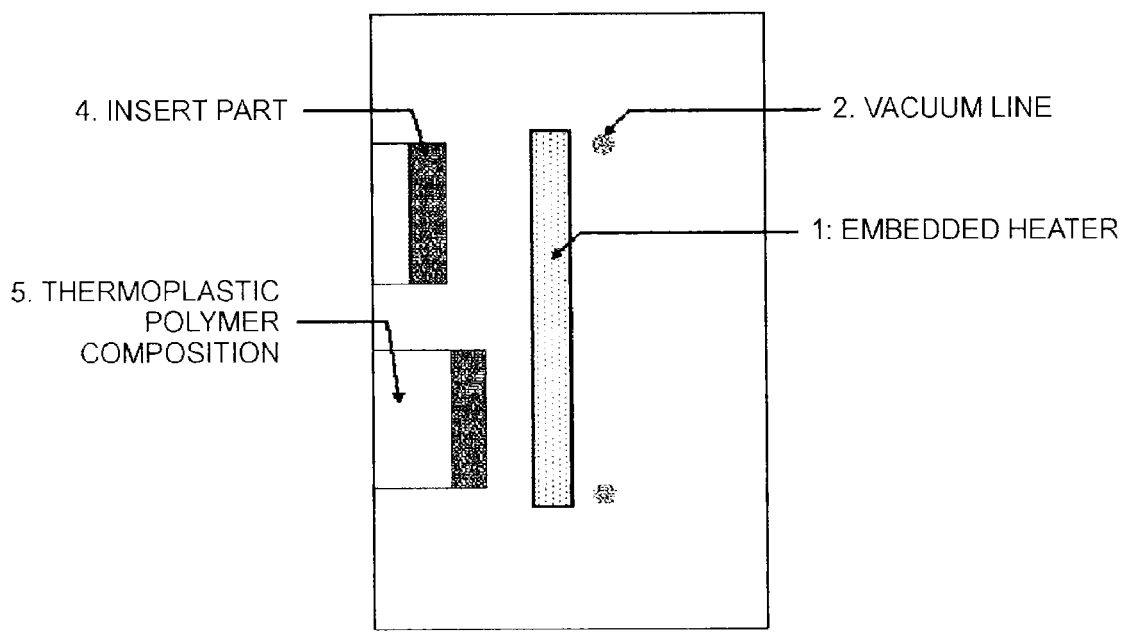
FIG. 3 is a vertically cross-sectional view of a movable side mold for insert molding, employed in examples and comparative examples.
Figure 4:
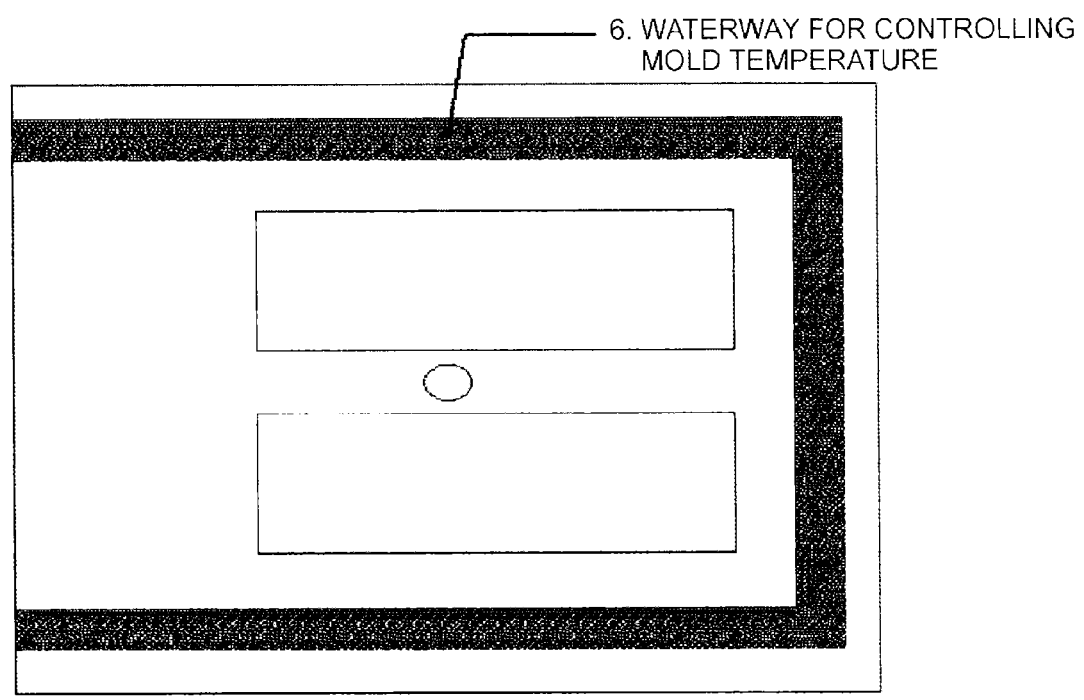
FIG. 4 is a front view of a fixed side mold for insert molding, employed in examples and comparative examples.
Figure 5:
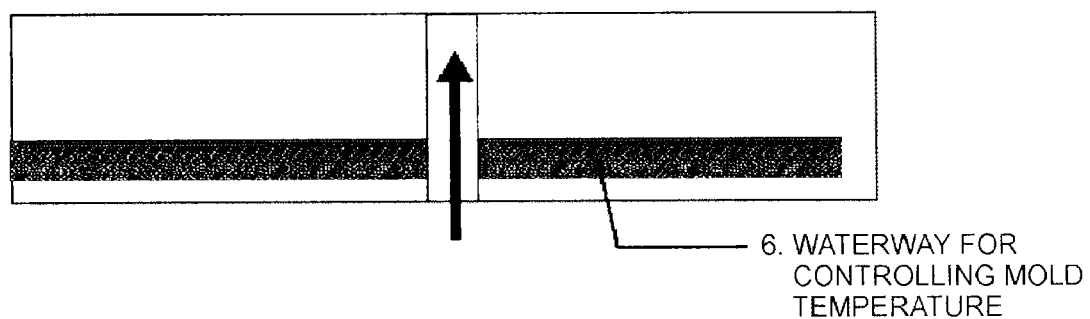
FIG. 5 is a horizontally cross-sectional view of a fixed side mold for insert molding, employed in examples and comparative examples.
Figure 6:
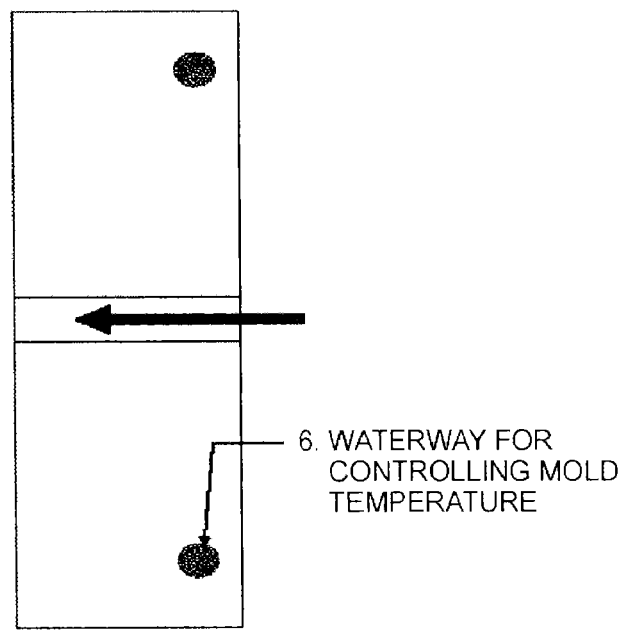
FIG. 6 is a vertically cross-sectional view of a fixed side mold for insert molding, employed in examples and comparative examples.

FIGS. 1 to 3 are a front view, a horizontally cross-sectional view and a vertically cross-sectional view of a movable side mold, respectively, and FIGS. 4 to 6 are a front view, a horizontally cross-sectional view and a vertically cross-sectional view of a fixed side mold, respectively.

In FIG. 1, two cavities of CAV1 and CAV2 are shown. Those cavities are cavities dug so as to have different depth, and CAV1 or CAV2 can be selected by switching a flow passage. Furthermore, an insert part (4) arranged in the cavity can be fixed by a vacuum line (2). FIGS. 2 and 3 show the state that the insert part (4) and a thermoplastic polymer composition (5) are arranged in the cavity. FIG. 4 shows a waterway (6) for controlling a mold temperature, and the thick arrow in FIGS. 1, 5 and 6 shows a route of the thermoplastic polymer composition supplied from a cylinder.

(Insert Molding Condition)

In the present invention, the temperature of the insert part during insert molding is preferably 30 to 150° C. When the temperature of the insert part falls within the temperature range, sufficient adhesive strength is obtained between the insert part and the thermoplastic polymer composition. From the same view point, the temperature of the insert part is preferably 50 to 150° C., more preferably 80 to 150° C., still more preferably 100 to 150° C., and particularly preferably 115 to 145° C. When the temperature of the insert part is 30° C. or higher, cooling facility is not required to be separately provided, and sufficient insert adhesiveness is obtained between the insert part and the thermoplastic polymer composition. On the other hand, where the temperature is 150° C. or lower, shrinkage and deformation of the thermoplastic polymer composition in the cooling process is small, and a target shape is easily obtained. Additionally, energy necessary for heating and cooling is small, and molding cycle time is reduced.

The method for setting the temperature of the insert part during insert molding to the above range is not particularly limited. Examples of the method include a method of conducting the temperature control through a temperature control system of a mold, and a method of providing a system of selectively controlling the temperature of the insert part. In the case where the temperature is controlled to 50° C. or lower, a method of conducting the temperature control through a temperature control system of a mold is easy and simple. On the other hand, in the case where the temperature is controlled to 50° C. or higher, a method of providing a system of selectively controlling the temperature of the insert part is preferred from the view point of easiness of temperature control.

The "temperature control system of a mold" is a function to control the temperature of the mold itself, of the mold, and the "system of selectively controlling the temperature of the insert part" is a temperature control system for the insert part only, provided near the insert part.

By selectively controlling the temperature of the insert part, the temperature of the insert part is easily increased, and the adhered body is easily released. The selective control of the temperature of the insert part can utilize a heating element such as an electric heater, an electromagnetic induction heater, a heating medium or a hot plate.

In the case of utilizing an electric heater or an electromagnetic induction heater, the heater is utilized by embedding in a mold or by fixing a heating plate having a heater embedded therein to the mold surface. In the case of utilizing a heating medium, a method in which a heating medium flow passage is provided in a mold, and a heating medium having a given temperature is supplied from the outside and discharged to the outside is exemplified. The heating medium is not particularly limited, and examples thereof include fluids such as oil, water, water vapor, air, nitrogen and a combustion gas.

When a metal is used in the insert part, heating may be conducted by directly passing an electric current through the metal, and induction heating may be conducted by an induction coil.

The time for maintaining the temperature of the insert part in the above-described range is not particularly limited. The time is preferably 3 minutes or less, and more preferably 2 minutes or less, from the view point of production efficiency, and is preferably 5 seconds or more, more preferably 15 seconds or more, and still more preferably 30 seconds or more, from the view point of adhesiveness. Even though immediately transferring to a cooling operation described hereinafter without substantially providing the retention time, sufficient adhesive force is obtained.

To efficiently control the temperature of the insert part, it is effective to provide a heat-insulating structure between the periphery of the insert part and the mold.

The procedures to control the temperature of the insert part to the above-described range are as follows.
(1) A method of setting the temperature of the insert part to a given temperature before filling the mold having the insert part held therein with the thermoplastic polymer composition (pre-heating method)
(2) A method of increasing the temperature of the insert part to a given temperature in the mold, after filling the mold with the thermoplastic polymer composition without conducting temperature control in the stage of filling the mold with the thermoplastic polymer composition (post-heating method)
(3) A method of increasing the temperature of the insert part to a certain extent in the stage of filling the mold with the thermoplastic polymer composition, filling the mold with the thermoplastic polymer composition, and then increasing the temperature of the insert part to a given temperature in the mold.

Of those methods, methods (1) and (2) are preferred from the view point of adhesiveness control, the method (1) is more preferred from the view point of easiness of the temperature control of the insert part, and method (2) is more preferred from the view point of the appearance of an adhered body.

In the case of the method (1), the temperature control of the insert part may be stopped just after initiation of the operation of filling the mold with the thermoplastic polymer composition, and the temperature control of the insert part may be continued during filling the mold with the thermoplastic polymer composition.

After obtaining the adhered body by increasing the temperature of the insert part to the given temperature, the adhered body is cooled as necessary in order to take the adhered body out from the mold (release from the mold). It is preferred that the surface temperature of the adhered body is 30 to 50° C. by the time of taking the adhered body out from the mold. The cooling method is not particularly limited, and for example, a method of conducting the cooling through a mold temperature control system of the mold (including natural cooling) is exemplified. It is possible to shorten the cooling time by arranging a flow passage of a cooling medium near the adhered body. Particularly in the case where the temperature of the insert part has been selectively controlled using a heating medium, the cooling can be conducted by switching the heating medium to a cooling medium utilizing the flow passage of the heating medium.

In the present invention, a hot runner can be used during insert molding as the means capable of omitting the removal of the solidified resin in a mold flow passage (for example, a sprue, a runner and a gate) and easily releasing the adhered body from the mold. The heating method of the hot runner can use any of an internal heating method and an external heating method. Examples of a gate sealing method of the hot runner include a method by thermal balance and a method by a valve gate. Examples of the sealing by the thermal balance include hot chip, sprue gate and hot edge.

The thermoplastic polymer composition of the present invention can be adhered to a ceramic, a metal or a synthetic resin without performing a primer treatment or the like, and has excellent flexibility, mechanical properties, moldability and heat resistance. The molded article in which the thermoplastic polymer composition of the present invention is adhered to a ceramic, a metal or a synthetic resin has practically sufficient adhesiveness even though placed in an environment of 60° C. or higher, and can be used in a wide range of uses. Furthermore, an adhered body in which the thermoplastic polymer composition is adhered to a ceramic, a metal or a synthetic resin can be produced by insert molding with excellent insert adhesiveness, and can be used in uses requiring higher adhesive strength in an environment of 60° C. or higher.

The thermoplastic polymer composition of the present invention can be widely applied as the molded article. In the molded article using the thermoplastic polymer composition of the present invention, a shape, a structure, uses and the like are not particularly limited, and any of those is encompassed within the scope of the present invention so long as the thermoplastic polymer composition of the present invention is adhered to a ceramic, a metal or a synthetic resin.

For example, the molded article can be preferably used in an impact buffer material adhered to a housing of electrical appliances, a slip stopper, a covering material, a waterproof material, a design material, a molding of automobile windows, a gasket, a connecting part between a glass and a metal frame in a solar cell module, and the like.

The thermoplastic polymer composition of the present invention is preferably used as an adhesive. As shown in the examples of the present application, the thermoplastic polymer composition of the present invention has good adhesiveness to any of a ceramic, a metal and a synthetic resin, and is therefore preferably used as an adhesive for adhering not only the same kind of materials, but different kind of materials. Additionally, the thermoplastic polymer composition has flexibility, and therefore has buffer action to, for example, the difference in a coefficient of thermal expansion of different kind of materials.

The thermoplastic polymer composition of the present invention is preferably used as an adhesive sheet. The thermoplastic polymer composition can bond not only the same kind of materials with each other but different kind of materials with each other by preparing a sheet of the composition by an extrusion molding method or the like, and sandwiching the sheet with members constituted of at least one kind of a ceramic, a metal and a synthetic resin, followed by thermocompression bonding. Furthermore, the thermoplastic polymer composition has flexibility, and therefore can be shaped into n irregular part by a vacuum molding method or the like. Thus, the composition is useful as an adhesive layer between a decorative surface material and a base material.

EXAMPLES

The present invention is described below in further detail by examples and the like, but it should be understood that the invention is not construed as being limited to those.

Each component used in the following examples and comparative examples is as follows.

[Thermoplastic Elastomer (A1)]64 L of cyclohexane as a solvent and 0.20 L of sec-butyllithium (10 mass % cyclohexane solution) as an initiator were charged in a pressure vessel substituted with nitrogen and dried, and 0.3 L (corresponding to 15 times in a stoichiometric ratio to lithium atoms in the initiator) of tetrahydrofuran as an organic Lewis base was charged therein. After increasing the temperature to 50° C., 2.3 L of styrene was added and polymerization was conducted for 3 hours. Subsequently, 23 L of isoprene was added and polymerization was conducted for 4 hours. 2.3 L of styrene was further added and polymerization was conducted for 3 hours. The reaction liquid obtained was poured in 80 L of methanol, and solids precipitated were filtered off and dried at 50° C. for 20 hours. Thus, a triblock copolymer of poly styrene-polyisoprene-poly styrene was obtained.

Subsequently, 10 kg of the triblock copolymer of polystyrene-polyisoprene-polystyrene obtained above was dissolved in 200 L of cyclohexane, palladium carbon (palladium supporting amount: 5 mass %) as a hydrogenation catalyst was added in an amount of 5 mass % based on the copolymer, and reaction was conducted under the conditions of hydrogen pressure: 2 MPa and 150° C. for 10 hours. After naturally cooling and pressure discharge, palladium carbon was removed by filtration, and the filtrate was concentrated and then vacuum dried. Thus, a hydrogenated product of the triblock copolymer of polystyrene-polyisoprene-polystyrene (hereinafter referred to as a thermoplastic elastomer (A1)) was obtained. The thermoplastic elastomer (A1) obtained had a weight average molecular weight of 107,000, a styrene content of 21 mass %, the degree of hydrogenation of 85%, a molecular weight distribution of 1.04, and the total amount of 1,2-bonds and 3,4-bonds contained in a polyisoprene block of 60 mol %.

[Thermoplastic Elastomer (A2)]

86 L of cyclohexane as a solvent and 0.22 L of sec-butyllithium (10 mass % cyclohexane solution) as an initiator were charged in a pressure vessel substituted with nitrogen and dried, and 0.02 L (corresponding to 0.7 times in a stoichiometric ratio to lithium atoms in the initiator) of ethylene glycol dimethyl ether as an organic Lewis base was charged therein. After increasing the temperature to 50° C., 2.3 L of styrene was added and polymerization was conducted for 3 hours. Subsequently, 25.5 L of butadiene was added and polymerization was conducted for 4 hours. 2.3 L of styrene was further added and polymerization was conducted for 3 hours. The reaction liquid obtained was poured in 80 L of methanol, and solids precipitated were filtered off and dried at 50° C. for 20 hours. Thus, a triblock copolymer of polystyrene-polybutadiene-polystyrene was obtained.

Subsequently, 10 kg of the triblock copolymer of polystyrene-polybutadiene-polystyrene obtained above was dissolved in 200 L of cyclohexane, palladium carbon (palladium supporting amount: 5 mass %) as a hydrogenation catalyst was added in an amount of 5 mass % based on the copolymer, and reaction was conducted under the conditions of hydrogen pressure: 2 MPa and 150° C. for 10 hours. After naturally cooling and pressure discharge, palladium carbon was removed by filtration, and the filtrate was concentrated and then vacuum dried. Thus, a hydrogenated product of the triblock copolymer of polystyrene-polybutadiene-polystyrene (hereinafter referred to as a thermoplastic elastomer (A2)) was obtained. The thermoplastic elastomer (A2) obtained had a weight average molecular weight of 126,000, a styrene content of 21 mass %, the degree of hydrogenation of 95%, a molecular weight distribution of 1.11, and the amount of 1,2-bonds contained in a polybutadiene block of 78 mol %.

[Thermoplastic Elastomer (A3)]

150 L of cyclohexane as a solvent and 0.22 L of sec-butyllithium (10 mass % cyclohexane solution) as an initiator were charged in a pressure vessel substituted with nitrogen and dried, and 0.3 L (corresponding to 14 times in a stoichiometric ratio to lithium atoms in the initiator) of tetrahydrofuran as an organic Lewis base was charged therein. After increasing the temperature to 50° C., 0.72 L of styrene was added and polymerization was conducted for 3 hours. Subsequently, a mixture of 12.6 L of isoprene and 14.0 L of butadiene was added and polymerization was conducted for 4 hours. 2.2 L of styrene was further added and polymerization was conducted for 3 hours. The reaction liquid obtained was poured in 80 L of methanol, and solids precipitated were filtered off and dried at 50° C. for 20 hours. Thus, a triblock copolymer of polystyrene-poly(isoprene/butadiene)-polystyrene was obtained.

Subsequently, 10 kg of the triblock copolymer of polystyrene-poly(isoprene/butadiene)-polystyrene obtained above was dissolved in 200 L of cyclohexane, palladium carbon (palladium supporting amount: 5 mass %) as a hydrogenation catalyst was added in an amount of 5 mass % based on the copolymer, and reaction was conducted under the conditions of hydrogen pressure: 2 MPa and 150° C. for 10 hours. After naturally cooling and pressure discharge, palladium carbon was removed by filtration, and the filtrate was concentrated and then vacuum dried. Thus, a hydrogenated product (A3) of the triblock copolymer of polystyrene-poly(isoprene/butadiene)-polystyrene was obtained. The thermoplastic elastomer (A3) obtained had a weight average molecular weight of 165,000, a styrene content of 13 mass %, the degree of hydrogenation of 85%, a molecular weight distribution of 1.02, and the total amount of 1,2-bonds and 3,4-bonds of 63 mol %.

[Thermoplastic Elastomer (A4)]

80 L of cyclohexane as a solvent and 0.40 L of sec-butyllithium (10 mass % cyclohexane solution) as an initiator were charged in a pressure vessel substituted with nitrogen and dried, and 0.6 L (corresponding to 15 times in a stoichiometric ratio to lithium atoms in the initiator) of tetrahydrofuran as an organic Lewis base was charged therein. After increasing the temperature to 50° C., 4.2 L of styrene was added and polymerization was conducted for 3 hours. Subsequently, 28 L of isoprene was added and polymerization was conducted for 4 hours. 4.2 L of styrene was further added and polymerization was conducted for 3 hours. The reaction liquid obtained was poured in 80 L of methanol, and solids precipitated were filtered off and dried at 50° C. for 20 hours. Thus, a triblock copolymer of polystyrene-polyisoprene-polystyrene was obtained.

Subsequently, 20 kg of the triblock copolymer of polystyrene-polyisoprene-polystyrene obtained above was dissolved in 200 L of cyclohexane, palladium carbon (palladium supporting amount: 5 mass %) as a hydrogenation catalyst was added in an amount of 5 mass % based on the copolymer, and reaction was conducted under the conditions of hydrogen pressure: 2 MPa and 150° C. for 10 hours. After naturally cooling and pressure discharge, palladium carbon was removed by filtration, and the filtrate was concentrated and then vacuum dried. Thus, a hydrogenated product of the triblock copolymer of polystyrene-polyisoprene-polystyrene (hereinafter referred to as a thermoplastic elastomer (A4)) was obtained. The thermoplastic elastomer (A4) obtained had a weight average molecular weight of 72,800, a styrene content of 30 mass %, the degree of hydrogenation of 90%, a molecular weight distribution of 1.04, and the total amount of 1,2-bonds and 3,4-bonds contained in a polyisoprene block of 60 mol %.

[Thermoplastic Elastomer (A'5)]

80 L of cyclohexane as a solvent and 0.047 L of sec-butyllithium (10 mass % cyclohexane solution) as an initiator were charged in a pressure vessel substituted with nitrogen and dried. After increasing the temperature to 50° C., 2.3 L of styrene was added and polymerization was conducted for 3 hours. Subsequently, a mixture of 8.1 L of isoprene and 6.6 L of butadiene was added and polymerization was conducted for 4 hours. 2.3 L of styrene was further added and polymerization was conducted for 3 hours. The reaction liquid obtained was poured in 80 L of methanol, and solids precipitated were filtered off and dried at 50° C. for 20 hours. Thus, a triblock copolymer of polystyrene block-poly(isoprene/butadiene) block-polystyrene block was obtained.

Subsequently, 20 kg of the triblock copolymer of polystyrene block-poly(isoprene/butadiene) block-polystyrene block obtained above was dissolved in 200 L of cyclohexane, palladium carbon (palladium supporting amount: 5 mass %) as a hydrogenation catalyst was added in an amount of 5 mass % based on the copolymer, and reaction was conducted under the conditions of hydrogen pressure: 2 MPa and 150° C. for 10 hours. After naturally cooling and pressure discharge, palladium carbon was removed by filtration, and the filtrate was concentrated and then vacuum dried. Thus, a hydrogenated product of the triblock copolymer of polystyrene block-poly(isoprene/butadiene) block-polystyrene block (hereinafter referred to as a thermoplastic elastomer (A'5)) was obtained. The thermoplastic elastomer (A'5) obtained had a weight average molecular weight of 380,000, a styrene content of 30 mass %, the degree of hydrogenation of 97%, a molecular weight distribution of 1.04, and the total amount of 1,2-bonds and 3,4-bonds contained in the poly(isoprene/butadiene) block of 5 mol %.

[Thermoplastic Elastomer (A'6)]

80 L of cyclohexane as a solvent and 0.32 L of sec-butyllithium (10 mass % cyclohexane solution) as an initiator were charged in a pressure vessel substituted with nitrogen and dried. After increasing the temperature to 50° C., 2.5 L of styrene was added and polymerization was conducted for 3 hours. Subsequently, 30 L of isoprene was added and polymerization was conducted for 4 hours. 2.5 L of styrene was further added and polymerization was conducted for 3 hours. The reaction liquid obtained was poured in 80 L of methanol, and solids precipitated were filtered off and dried at 50° C. for 20 hours. Thus, a triblock copolymer of polystyrene block-polyisoprene block-polystyrene block was obtained.

Subsequently, 20 kg of the triblock copolymer of polystyrene block-polyisoprene block-polystyrene block obtained above was dissolved in 200 L of cyclohexane, palladium carbon (palladium supporting amount: 5 mass %) as a hydrogenation catalyst was added in an amount of 5 mass % based on the copolymer, and reaction was conducted under the conditions of hydrogen pressure: 2 MPa and 150° C. for 10 hours. After naturally cooling and pressure discharge, palladium carbon was removed by filtration, and the filtrate was concentrated and then vacuum dried. Thus, a hydrogenated product of the triblock copolymer of polystyrene block-polyisoprene block-polystyrene block (hereinafter referred to as a thermoplastic elastomer (A'6)) was obtained. The thermoplastic elastomer (A'6) obtained had a weight average molecular weight of 97,000, a styrene content of 18 mass %, the degree of hydrogenation of 97%, a molecular weight distribution of 1.04, and the total amount of 1,2-bonds and 3,4-bonds contained in the polyisoprene block of 5 mol %.

[Polar Group-Containing Polypropylene Resin (B1)]

42 g of polypropylene "Prime Polypro F327" (manufactured by Prime Polymer Co., Ltd.), 160 mg of maleic anhydride and 42 mg of 2,5-dimethyl-2,5-di(tertiary butylperoxy)hexane were melt-kneaded under the conditions of 180° C. and the number of revolution of a screw of 40 rpm using a batch mixer. The kneaded material (polar group-containing polypropylene resin (B1)) obtained had MFR [230° C., load: 2.16 kg (21.18N)] of 6 g/10 min, a maleic anhydride concentration of 0.3%, and a melting point of 138° C.

The maleic anhydride concentration is a value obtained titrating the kneaded material with a methanol solution of potassium hydroxide, and hereinafter the same. The melting point is a value read from an endothermic peak of a differential scanning calorimetry curve when increasing a temperature in a rate of 10° C./min, and hereinafter the same.

[Polar Group-Containing Polypropylene Resin (B2)]

42 g of polypropylene "NOVATEC-PP FG3DE (manufactured by Japan Polyprolyene Corporation), 160 mg of maleic anhydride and 42 mg of 2,5-dimethyl-2,5-di(tertiary butylperoxy)hexane were melt-kneaded under the conditions of 180° C. and the number of revolution of a screw of 40 rpm using a batch mixer. The kneaded material (polar group-containing polypropylene resin (B2)) obtained had MFR [230° C., load: 2.16 kg (21.18N)] of 10 g/10 min, a maleic anhydride concentration of 0.3%, and a melting point of 143° C.

[Polar Group-Containing Polypropylene Resin (B3)]

42 g of polypropylene "NOVATEC-PP F113G (manufactured by Prime Polymer Co., Ltd.), 5 g of maleic anhydride and 1.3 g of 2,5-dimethyl-2,5-di(tertiary butylperoxy) hexane were melt-kneaded under the conditions of 200° C. and the number of revolution of a screw of 100 rpm using a batch mixer. The kneaded material (polar group-containing polypropylene resin (B3)) obtained had MFR [230° C., load: 2.16 kg (21.18N)] of 250 g/10 min, a maleic anhydride concentration of 3.0%, and a melting point of 161° C.

[Polar Group-Containing Polypropylene Resin (B4)]

42 g of polypropylene "NOVATEC-PP E111G (manufactured by Prime Polymer Co., Ltd.), 8.4 g of maleic anhydride and 126 mg of 2,5-dimethyl-2,5-di(tertiary butylperoxy) hexane were melt-kneaded under the conditions of 200° C. and the number of revolution of a screw of 100 rpm using a batch mixer. The kneaded material (polar group-containing polypropylene resin (B4)) obtained had MFR [230° C., load: 2.16 kg (21.18N)] of 80 g/10 min, a maleic anhydride concentration of 6.0%, and a melting point of 135° C.

[Polar Group-Containing Polyethylene Resin (B'5)]

42 g of polyethylene "NEO-ZEX 0434N" (manufactured by Prime Polymer Co., Ltd.), 160 mg of maleic anhydride and 42 mg of 2,5-dimethyl-2,5-di(tertiary butylperoxy) hexane were melt-kneaded under the conditions of 180° C. and the number of revolution of a screw of 40 rpm using a batch mixer. The kneaded material (polar group-containing polyethylene resin (B'5) obtained had MFR [190° C., load: 2.16 kg (21.18N)] of 2 g/10 min, a maleic anhydride concentration of 0.3%, and a melting point of 117° C.

[Tackifier Resin (C1)]

Hydrogenated aromatic hydrocarbon resin "Regalite 1100" (manufactured by Eastman Chemical Company), softening point: 100° C.

[Tackifier Resin (C2)]

Hydrogenated aromatic hydrocarbon resin "Regalite 1125" (manufactured by Eastman Chemical Company), softening point: 123° C.

[Tackifier Resin (C3)]

Hydrogenated terpene resin "CLEARON M115" (manufactured by Yasuhara Chemical Co., Ltd.), softening point: 115° C.

[Tackifier Resin (C4)]

Hydrogenated terpene resin "CLEARON P150" (manufactured by Yasuhara Chemical Co., Ltd.), softening point: 152° C.

[Softener (D1)]

Paraffinic process oil "Diana Process PW-380" (manufactured by Idemitsu Kosan Co., Ltd.)

Preparation of test pieces in examples and comparative examples and measurement or evaluation of each property were conducted as follows, and the results are shown in Tables 1 and 2.

(1) Measurement of Melt Flow Rate (MFR)

Each sheet of the thermoplastic polymer compositions prepared by the following examples and comparative examples was finely cut, MFR was measured under the conditions of 230° C. and load: 2.16 kg (21.18N) by the method according to JIS K7210, and the value was used as an index of moldability. Moldability is excellent as the value of MFR is large.

(2) Measurement of Hardness

Sheets of each thermoplastic polymer composition prepared by the following examples and comparative examples were piled to prepare a stacked material having a thickness of 6 mm, and the A hardness thereof was measured by a type A durometer according to JIS K6253.

(3) Tensile Strength at Break and Elongation at Break

Dumbbell type test piece (dumbbell shape #5) was prepared from each sheet of the thermoplastic polymer compositions prepared by the following examples and comparative examples by the method according to JIS K6251, and tensile strength at break and elongation at break thereof was measured at 23° C. in a tension rate of 500 mm/min.

(4) Measurement of Adhesive Force

Regarding the laminate of PET/thermoplastic polymer composition/glass sheet and the laminate of PET/thermoplastic polymer composition/aluminum plate, prepared by the method described below, peel strength between the thermoplastic polymer composition layer and the glass plate and between the thermoplastic polymer composition layer and the aluminum plate was measured respectively under the conditions of peel angle: 180°, tension rate: 50 mm/min and ambient temperature: 23° C. or 60° C. according to JIS K6854-2, and adhesive force was measured. The adhesive force at 60° C. is an index of heat resistance.

(5) Measurement of Bleed Property

Each sheet of the thermoplastic polymer compositions prepared by the following examples and comparative examples was cut into a size having a diameter of 29 mm, and sandwiched between cardboards. A weight of 1 kg was placed on the resulting assembly, and the state of the cardboards after allowing to stand at 70° C. for 360 hours was observed. The case where bleed is not observed was indicated as ○, and the case where bleed is observed is indicated as ×.

<Preparation of Laminate with Glass Plate>

Both surfaces of a glass plate having a length of 75 mm, a width of 25 mm and a thickness of 1 mm were cleaned with a surfactant aqueous solution, methanol, acetone and distilled water as cleaning liquids in this order, and dried. Each sheet of the glass plate, the thermoplastic polymer compositions prepared by the following examples and comparative examples, and a polyethylene terephthalate (PET) sheet having a thickness of 50 μm were piled in this order, and the resulting layered product was arranged at a central part of a metal space having an outer size of 200 mm×200 mm, an inner size of 150 mm×150 mm and a thickness of 2 mm.

The piled sheet and the metal spacer were sandwiched between polytetrafluoroethylene sheets, and further sandwiched with metal plates from the outside. Compression molding was conducted under the temperature condition shown in Table 1 or Table 2 and a load of 20 kgf/cm$^2$ (2 N/mm$^2$) for 3 minutes to obtain a laminate of PET/thermoplastic polymer composition/glass plate.

<Preparation of Laminate with Aluminum Plate>

A laminate of PET/thermoplastic polymer composition/aluminum plate was obtained by conducting the same operations as in the preparation of the laminate with glass plate, except that both surfaces of an aluminum plate having a length of 75 mm, a width of 25 mm and a thickness of 1 mm were cleaned with a surfactant aqueous solution and distilled water as cleaning liquids in this order, and dried.

Examples 1 to 17 and Comparative Examples 1 to 5

Raw materials shown in Table 1 or Table 2 were melt-kneaded in the proportions shown in Table 1 or Table 2 under the conditions of 230° C. and screw revolution of 200 rpm using a twin-screw extruder, and then extruded in a strand shape. The strand-shaped material was cut to obtain pellets of the thermoplastic polymer composition. The pellets obtained were compression molded under the conditions of 230° C. and a load of 100 kgf/cm$^2$ (9.8 N/mm$^2$) for 3 minutes. Thus, a sheet having a thickness of 1 mm of the thermoplastic polymer composition was obtained.

In Examples 1 to 14 and Comparative Examples 1 to 5, MFR, hardness, tensile strength at break and elongation at break of the sheet of the thermoplastic polymer composition obtained were measured. The adhesive strength between the sheet and the glass plate and the adhesive strength between the sheet and the aluminum plate were measured according to the method described above. Furthermore, the bleed property of the thermoplastic polymer composition obtained was measured according to the method described above. The results are shown in Table 1.

In all of the examples and the comparative examples, the production of the molded article by insert molding was conducted and insert adhesiveness was evaluated, according to the method described below.

Molds shown in FIGS. 1 to 6 were used, and an adherend (insert part) shown in Table 1 or Table 2 was fixed in the mold by a vacuum line. Electric current was passed through a heater, and the temperature of the adherend was controlled to a temperature shown in Table 1 or Table 2 by thermal conduction. CAV 2 was filled with the thermoplastic polymer composition having the formulation shown in Table 1 or Table 2, and just after initiation of filling, electric current application to the heater was stopped, and the surface temperature of an adhered body was cooled to 30° C. Thus, the adhered body was obtained. The insert adhesiveness (adhesive force) at 23° C. of the adhered body obtained is shown in Tables 1 and 2.

(Adherend)

Each of insert parts below having a length of 100 mm, a width of 35 mm and a thickness of 1 mm in which both surfaces were cleaned with a surfactant aqueous solution and distilled water in this order and then dried at 65° C. was used as the adherend.

Insert part (a): Aluminum plate (A5052P)

Insert part (b): Electrolytic zinc-coated steel plate (SECC)

TABLE 1

|  |  |  | Example |  |  |  |  |  |  |
|---|---|---|---|---|---|---|---|---|---|
|  |  |  | 1 | 2 | 3 | 4 | 5 | 6 | 7 |
| Compounding component (mass ratio) | Thermoplastic elastomer | (A1) | 100 | 100 | 100 | 100 | 100 | 100 | 100 |
|  |  | (A2) |  |  |  |  |  |  |  |
|  |  | (A3) |  |  |  |  |  |  |  |
|  |  | (A4) |  |  |  |  |  |  |  |
|  |  | (A'5) |  |  |  |  |  |  |  |
|  |  | (A'6) |  |  |  |  |  |  |  |
|  | Polar group-containing olefinic polymer | (B1) | 25 |  | 60 | 31 | 28 | 31 | 36 |
|  |  | (B2) |  | 25 |  |  |  |  |  |
|  |  | (B3) |  |  |  |  |  |  |  |
|  |  | (B4) |  |  |  |  |  |  |  |
|  |  | (B'5) |  |  |  |  |  |  |  |
|  | Tackifier resin | (C1) |  |  |  |  | 25 |  |  |
|  |  | (C2) |  |  |  |  |  | 11 | 25 | 43 |
|  |  | (C3) |  |  |  |  |  |  |  |
|  |  | (C4) |  |  |  |  |  |  |  |
|  | Softener | (D1) |  |  |  |  |  |  |  |
| Properties | Hardness (Type A) |  | 76 | 77 | 83 | 77 | 76 | 79 | 86 |
|  | Tensile strength at break (MPa) |  | 15 | 13 | 19 | 18 | 17 | 20 | 18 |
|  | Elongation at break (%) |  | 680 | 660 | 740 | 750 | 670 | 710 | 680 |
|  | Melt flow rate (g/10 min) |  | 5.0 | 7.0 | 5.1 | 18 | 16 | 16 | 30 |
| Adhesive force | Glass (23° C.) (N/25 mm) |  | 165 | 230 | 175 | 140 | 142 | 155 | 165 |
|  | Glass (60° C.) (N/25 mm) |  | 170 | 220 | 169 | 145 | 138 | 160 | 170 |
|  | Aluminum (23° C.) (N/25 mm) |  | 167 | 235 | 180 | 145 | 148 | 160 | 170 |
|  | Aluminum (60° C.) (N/25 mm) |  | 175 | 223 | 163 | 142 | 140 | 165 | 173 |
| Insert molding | Insert part |  | (a) | (a) | (a) | (a) | (a) | (a) | (a) |
|  | Temperature of insert part (° C.) |  | 120 | 120 | 120 | 120 | 120 | 120 | 120 |
|  | Holding time (sec) |  | 0 | 0 | 0 | 0 | 0 | 0 | 0 |
|  | Cylinder temperature (° C.) |  | 230 | 230 | 230 | 230 | 230 | 230 | 230 |
|  | Mold temperature (° C.) |  | 30 | 30 | 30 | 30 | 30 | 30 | 30 |
|  | Insert adhesiveness (23° C.) (N/25 mm) |  | 79 | 105 | 90 | 70 | 72 | 83 | 80 |
| Bleed characteristics |  |  | ○ | ○ | ○ | ○ | ○ | ○ | ○ |

|  |  |  | Example |  |  |  |  |  |  |
|---|---|---|---|---|---|---|---|---|---|
|  |  |  | 8 | 9 | 10 | 11 | 12 | 13 | 14 |
| Compounding component (mass ratio) | Thermoplastic elastomer | (A1) | 100 | 100 |  |  |  | 100 | 100 |
|  |  | (A2) |  |  | 100 |  |  |  |  |
|  |  | (A3) |  |  |  | 100 |  |  |  |
|  |  | (A4) |  |  |  |  | 100 |  |  |
|  |  | (A'5) |  |  |  |  |  |  |  |
|  |  | (A'6) |  |  |  |  |  |  |  |

TABLE 1-continued

| | | | | | | | | | |
|---|---|---|---|---|---|---|---|---|---|
| Compounding component (mass ratio) | Polar group-containing olefinic polymer | (B1) | 31 | 31 | 25 | 25 | 25 | | |
| | | (B2) | | | | | | | |
| | | (B3) | | | | | | 25 | |
| | | (B4) | | | | | | | 25 |
| | | (B'5) | | | | | | | |
| | Tackifier resin | (C1) | | | | | | | |
| | | (C2) | | | | | | | |
| | | (C3) | 25 | | | | | | |
| | | (C4) | | 25 | | | | | |
| | Softener | (D1) | | | | | | | |
| Properties | Hardness (Type A) | | 78 | 78 | 76 | 55 | 82 | 77 | 78 |
| | Tensile strength at break (MPa) | | 19 | 22 | 14 | 15 | 28 | 13 | 16 |
| | Elongation at break (%) | | 760 | 710 | 670 | 880 | 600 | 680 | 700 |
| | Melt flow rate (g/10 min) | | 17 | 13 | 4.8 | 2.1 | 13 | 10 | 8.0 |
| Adhesive force | Glass (23° C.) (N/25 mm) | | 129 | 180 | 55 | 56 | 90 | 155 | 164 |
| | Glass (60° C.) (N/25 mm) | | 125 | 175 | 35 | 39 | 100 | 140 | 145 |
| | Aluminum (23° C.) (N/25 mm) | | 125 | 183 | 52 | 60 | 95 | 160 | 170 |
| | Aluminum (60° C.) (N/25 mm) | | 120 | 178 | 35 | 43 | 103 | 145 | 148 |
| Insert molding | Insert part | | (a) | (a) | (a) | (a) | (a) | (a) | (a) |
| | Temperature of insert part (° C.) | | 120 | 120 | 120 | 120 | 120 | 120 | 120 |
| | Holding time (sec) | | 0 | 0 | 0 | 0 | 0 | 0 | 0 |
| | Cylinder temperature (° C.) | | 230 | 230 | 230 | 230 | 230 | 230 | 230 |
| | Mold temperature (° C.) | | 30 | 30 | 30 | 30 | 30 | 30 | 30 |
| | Insert adhesiveness (23° C.) (N/25 mm) | | 60 | 75 | 23 | 30 | 65 | 72 | 74 |
| Bleed characteristics | | | ○ | ○ | ○ | ○ | ○ | ○ | ○ |

| | | | Comparative Example | | | | |
|---|---|---|---|---|---|---|---|
| | | | 1 | 2 | 3 | 4 | 5 |
| Compounding component (mass ratio) | Thermoplastic elastomer | (A1) | 100 | 100 | 100 | | |
| | | (A2) | | | | | |
| | | (A3) | | | | | |
| | | (A4) | | | | | |
| | | (A'5) | | | | 100 | |
| | | (A'6) | | | | | 100 |
| | Polar group-containing olefinic polymer | (B1) | 5 | 150 | | 50 | 25 |
| | | (B2) | | | | | |
| | | (B3) | | | | | |
| | | (B4) | | | | | |
| | | (B'5) | | | 25 | | |
| | Tackifier resin | (C1) | | | | | |
| | | (C2) | | | | | |
| | | (C3) | | | | | |
| | | (C4) | | | | | |
| | Softener | (D1) | | | | 150 | |
| Properties | Hardness (Type A) | | 70 | 91 | 71 | 51 | 74 |
| | Tensile strength at break (MPa) | | 9 | 20 | 15 | 14 | 23 |
| | Elongation at break (%) | | 700 | 630 | 870 | 970 | 670 |
| | Melt flow rate (g/10 min) | | 2.9 | 5.4 | 4.0 | 0.36 | 5.2 |
| Adhesive force | Glass (23° C.) (N/25 mm) | | 30 | 150 | 2.0 | 34 | 2.8 |
| | Glass (60° C.) (N/25 mm) | | 15 | 140 | <1 | 19 | <1 |
| | Aluminum (23° C.) (N/25 mm) | | 33 | 156 | 3 | 38 | 2 |
| | Aluminum (60° C.) (N/25 mm) | | 18 | 135 | <1 | 19 | <1 |
| Insert molding | Insert part | | (a) | (a) | (a) | (a) | (a) |
| | Temperature of insert part (° C.) | | 120 | 120 | 120 | 120 | 120 |
| | Holding time (sec) | | 0 | 0 | 0 | 0 | 0 |
| | Cylinder temperature (° C.) | | 230 | 230 | 230 | 230 | 230 |
| | Mold temperature (° C.) | | 30 | 30 | 30 | 30 | 30 |
| | Insert adhesiveness (23° C.) (N/25 mm) | | 10 | 90 | <1 | 18 | <1 |
| Bleed characteristics | | | ○ | ○ | ○ | X | ○ |

TABLE 2

|  |  |  | Example | | |
|---|---|---|---|---|---|
|  |  |  | 15 | 16 | 17 |
| Compounding component (mass ratio) | Thermoplastic elastomer | (A1) | 100 | 100 | 100 |
|  |  | (A2) |  |  |  |
|  |  | (A3) |  |  |  |
|  |  | (A4) |  |  |  |
|  |  | (A'5) |  |  |  |
|  |  | (A'6) |  |  |  |
|  | Polar group-containing olefinic polymer | (B1) | 25 | 25 | 25 |
|  |  | (B2) |  |  |  |
|  |  | (B3) |  |  |  |
|  |  | (B4) |  |  |  |
|  |  | (B'5) |  |  |  |
|  | Tackifier resin | (C1) |  |  |  |
|  |  | (C2) |  |  |  |
|  |  | (C3) |  |  |  |
|  |  | (C4) |  |  |  |
|  | Softener | (D1) |  |  |  |
| Insert molding | Insert part |  | (a) | (b) | (a) |
|  | Temperature of insert part (° C.) |  | 140 | 120 | 120 |
|  | Holding time (sec) |  | 0 | 0 | 15 |
|  | Cylinder temperature (° C.) |  | 230 | 230 | 230 |
|  | Mold temperature (° C.) |  | 30 | 30 | 30 |
|  | Insert adhesiveness (23° C.) (N/25 mm) |  | 81 | 65 | 85 |

From Table 1, the thermoplastic polymer compositions obtained in Examples 1 to 14 have excellent adhesiveness to a ceramic (glass) and a metal without performing a primer treatment, and have excellent flexibility, mechanical properties and moldability. The adhesive force is good even in the environment of 60° C., and heat resistance is excellent. An adhered body having sufficient strength is obtained in insert molding, and insert adhesiveness is excellent. Bleed is not observed even through a molded article of the thermoplastic polymer composition is stored over a long period of time, and storage stability is excellent. From Examples 4 to 9, when the tackifier resin (C) is contained, moldability can be further improved while maintaining good adhesiveness to an environmental temperature.

The thermoplastic polymer composition of the present invention has excellent adhesiveness to an insert part such as aluminum or a zinc-plated steel plate (Examples 1 and 15). When the insert temperature is maintained in a certain period of time after filling of the thermoplastic polymer composition, adhesive force can be further improved (Example 17).

On the other hand, Comparative Example 1 in which the content of the polar group-containing polypropylene resin (B) is small, Comparative Example 3 using the polar group-containing polyethylene resin (B'5), and Comparative Examples 4 and 5 using the thermoplastic elastomers (A'5) and (A'6) having a polymer block including conjugated diene compound units in which the total amount of 1,2-bonds and 3,4-bonds is less than 40 mol %, in place of the thermoplastic elastomer (A) are all poor in adhesive force. In Comparative Example 2 in which the content of the polar group-containing polypropylene resin (B) exceeds 120 parts by mass, adhesive force at room temperature, heat resistance and insert adhesiveness are comparable to those of the examples, but flexibility is lacking.

INDUSTRIAL APPLICABILITY

The thermoplastic polymer composition of the present invention is useful as an adhesive in a joint part between a glass and an aluminum sash or an metal opening part, in a window of automobiles and buildings, and a connecting part between a glass and a metal frame, in solar cell modules.

The molded article using the thermoplastic polymer composition of the present invention is useful as a housing material of electric and electronic instruments, OA instruments, electrical household appliances, automobile members and the like. More specifically, the molded article is useful as a housing material of large-sized displays, notebook-size personal computers, mobile phones, PHS, PDA (personal digital assistants such as electronic diaries), electronic dictionaries, video cameras, digital still cameras, mobile radio cassette players or inverters.

The molded article is further useful in a wide range of uses as a molded body or structure adhered to a glass, such as a window molding or a gasket of automobiles or buildings, a sealing material of glasses, or corrosion-resistant materials.

The molded article is further useful as a separator of secondary batteries used in various information terminal equipments such as notebook-size personal computers, mobile phones or video cameras, hybrid cars or fuel-cell vehicles.

The invention claimed is:

1. An adhesive comprising:
   100 parts by mass of a thermoplastic elastomer (A) that is a polystyrene-polyisoprene-polystyrene triblock copolymer comprising (i) 13 to 30 mass % of styrene units and (ii) polyisoprene blocks having a total amount of 1,2-bonds and 3,4-bonds of 60 to 78 mol %, and
   25 to 60 parts by mass of a maleic anhydride modified polypropylene resin (B) per 100 parts by mass of the thermoplastic elastomer (A), the maleic anhydride modified polypropylene resin (B) having a melt flow rate of 10 to 250 g/10 min under the conditions of 230° C. and a load of 21.18N,
   provided that a thermoplastic polymer composition containing 1 part by mass or more of a polyvinyl acetal resin is excluded from the adhesive,
   wherein a polar group-containing structural unit is present in the maleic anhydride modified polypropylene resin (B) in an amount of 3.0 to 6.0 mass %, based on a total mass of the maleic anhydride modified polypropylene resin (B).

2. The adhesive according to claim 1, wherein the thermoplastic elastomer (A) has a weight average molecular weight (Mw) of from 70,000 to 200,000, and is a linear block copolymer.

3. The adhesive according to claim 1, further comprising a tackifier resin (C) of from 1 to 100 parts by mass per 100 parts by mass of the thermoplastic elastomer (A).

4. The adhesive according to claim 1, wherein the maleic anhydride modified polypropylene resin (B) has a melt flow rate of 10 to 100 g/10 min under the conditions of 230° C. and a load of 21.18N.

5. The adhesive according to claim 1, wherein the maleic anhydride modified polypropylene resin (B) has a melt flow rate of 10 to 50 g/10 min under the conditions of 230° C. and a load of 21.18N.

6. The adhesive according to claim 1, wherein the polyisoprene blocks have a total amount of 1,2-bonds and 3,4-bonds of from 60 mol % to 63 mol %.

7. The adhesive according to claim 1, wherein the adhesive has a melt flow rate of 8.0 to 30 g/10 min at 230° C. and a load of 21.18N.

8. The adhesive according to claim 1, wherein the adhesive comprises 20 parts by mass or less of a thermoplastic elastomer other than the thermoplastic elastomer (A).

9. The adhesive according to claim 1, wherein the adhesive comprises no thermoplastic elastomer other than the thermoplastic elastomer (A).

10. The adhesive according to claim 1, having a hardness of 30 to 90 as measured by JIS K6253.

11. A molded article, comprising the adhesive according to claim 1 adhered to a first ceramic, metal and/or synthetic resin.

12. The molded article according to claim 11, further comprising a second ceramic, metal or synthetic resin adhered to the first ceramic, metal, or synthetic resin via the adhesive.

13. A method for producing the molded article according to claim 11, prepared from the adhesive by insert molding, the method comprising filling a mold holding an insert part with the adhesive, and molding the adhesive, wherein a temperature of the insert part during the insert molding is from 30 to 150° C.

14. The method for producing the molded article according to claim 13, wherein the insert part is the first ceramic, a metal and/or a synthetic resin.

* * * * *